United States Patent
Abidi et al.

(10) Patent No.: US 8,386,360 B2
(45) Date of Patent: Feb. 26, 2013

(54) METHOD FOR PERSONALIZED GUIDANCE FOR REFERENCE DATE DEPENDENT INVESTMENTS

(75) Inventors: Navaid Abidi, Chicago, IL (US); Jon Hagen, Chicago, IL (US); Dirk Quayle, Northbrook, IL (US)

(73) Assignee: Business Logic Corporation, Chicago, IL (US)

( * ) Notice: Subject to any disclaimer, the term of this patent is extended or adjusted under 35 U.S.C. 154(b) by 0 days.

(21) Appl. No.: 13/557,391

(22) Filed: Jul. 25, 2012

(65) Prior Publication Data

US 2012/0296851 A1 Nov. 22, 2012

Related U.S. Application Data

(63) Continuation of application No. 12/437,083, filed on May 7, 2009, now Pat. No. 8,275,688.

(60) Provisional application No. 61/051,251, filed on May 7, 2008.

(51) Int. Cl.
*G06Q 40/00* (2012.01)
(52) U.S. Cl. ............ 705/36 R; 705/35; 705/37; 705/44; 705/4; 705/1.1
(58) Field of Classification Search ............... 705/1.1, 705/36, 36 R, 35, 4, 44, 36 T, 37; 709/203, 709/227; 725/112, 51, 87
See application file for complete search history.

(56) References Cited

U.S. PATENT DOCUMENTS

2007/0271166 A1* 11/2007 Boone et al. ............... 705/36 R

OTHER PUBLICATIONS

"T. Rowe Price Expands its Lineup of Retirement Funds; Assets Have Risen 10—Fold Since 2003 to Top $5 Billion." PR Newswire; Trade; p. NA ; Baltimore, Jun. 16, 2005.*

* cited by examiner

*Primary Examiner* — John H Holly
(74) *Attorney, Agent, or Firm* — Seyfarth Shaw LLP; Joseph P. Quinn

(57) ABSTRACT

A system and method is provided to generate personalized savings recommendation and/or needed assignments of reference-date dependent investments. Recommendations and assignments are based on differences between a investor profile and an ideal representative that was used to construct the investments. The system provides a configurable increasing level of financial service based on a Methodology Publisher's configuration for reference date based investments. A forecast simulation system is provided for each investor with various optimizers by the Methodologically Publisher to provide various level of financial services and portfolio recommendations for reference date dependent investments. Reports may be provided to investors illustrating progress toward goals and highlighting distribution of potential risky outcomes. An online inter-active mode may allow an investor to provide further profile information and customize a solution to their needs.

18 Claims, 15 Drawing Sheets

METHOD FOR PERSONALIZED GUIDANCE FOR REFERENCE DATE DEPENDENT INVESTMENTS

CROSS REFERENCE TO RELATED APPLICATIONS

This invention is a continuation of U.S. patent application Ser. No. 12/437,083, filed May 7, 2009, which claims priority to U.S. Provisional Patent Application No. 61/051,251 filed on May 7, 2008, which are incorporated herein by reference in their entirety.

FIELD OF THE INVENTION

This invention relates to financial advisory services and more particularly to a system and method for providing personalized financial services including automatically allocating and rebalancing of reference date dependent investments based on differences between investor's profile and that of the representative investor used in creation of reference date investment.

BACKGROUND OF THE INVENTION

Target Date Funds (TDF) have been among the most successful financial products ever created. They were designed to simplify long-term investing, and automatically become more conservative as fund approaches the retirement date. A significant amount of this success can be attributed Pension Protection Act of 2006, which enabled the U.S. Department of Labor to issue regulations that allowed TDFs to serve as qualified defaults within 401(k) defined contribution plans. As a result, TDFs have become the default investment option in over 60% of defined contribution plans with automatic enrollment.

Most investment vehicles are created based on specific capital market assumptions, economic dynamics and investment performance of risk reward trade-offs for given investment time-horizon. In addition to these considerations, reference date dependent investment vehicles' investment strategies are created based on assumptions about representative investor behavior and end goals. These assumptions include a beginning investor profile, investor saving behavior over time and investor end goals. The result of such assumptions is that the benchmark portfolio allocations exposure between TDFs vary significantly between families. These differences between TDFs have to be taken into account to present accurate retirement forecasts for investors, and to provide personalized guidance and advice.

Despite the success of TDFs, their short falls are gaining more recognition as such products go through their first stress test in a recessionary economic environment. For example, TDFs offer a "one size fits all" investment management solution that leave unanswered basic investor questions about how the TDF product will help investors achieve their retirement goals.

A particular Target Date investment vehicle may put significant retirement income at risk for an investor near retirement that is beyond that investors' risk tolerance. Such risks needs to be communicated to and highlighted for the investor. For example, in the year 2008 the 2010 TDFs from various families had equity percentage allocations ranging from 6% to 68%. This highlights the need for forward looking measures that can provide realistic retirement income estimates and risk estimates for the use of TDFs in retirement income planning for individuals.

Because investors generally lack knowledge of how an investment is related to achievement of goals, they cannot make appropriate saving contribution decisions. Accordingly, a vast majority of investors are underfunding their savings even though they may be automatically enrolled in their age appropriate TDF. Another current problem with the use of TDFs is that there is no current way to provide personalized guidance and/or advice to investors who have radically different profiles from the assumed idealized representative investor that was used to construct the Target Date investment. These problems have to be solved for TDFs to achieve their true potential within the financial industry. What is needed is a technology platform that provides financial services that can transform the product-oriented view of TDFs to a modern service-oriented, personalized financial services system which can also deliver automated managed accounts.

Traditional investor software provides asset allocation guidance and/or advice based on risk-reward trade-offs and investor risk preferences or goals. Some of these software packages provide asset class level guidance and/or advice, but leave the investor unsure of how to allocate to actual investable financial products.

More recently, a plethora of "retirement calculators" have become available to provide income forecasts at retirement based on static growth rates. More sophisticated versions allow Monte-Carlo simulations based on static investment strategies. These include "buy and hold" assumptions about the asset classes or periodically rebalanced to the original composition. Some of these calculators require the investor to input capital market assumptions such as future inflation and expected returns until investment horizons. These tools allow the investor to unrealistically manipulate economic variables to attain wishful retirement goals, and thus the resulting guidance and/or advice is misleading and dangerous. Careful calibration of the capital market assumptions by experts in the field is critical to providing an accurate long-term forecast for the investor. What is needed is a system that can either generate the capital market assumptions based on an accepted methodology and/or provide the capability for a registered investment advisor (RIA) or other asset manager to upload their existing capital market assumptions used across their business.

Most of the current the retirement calculators do not provide financial services for TDFs that accurately reflect the changing asset allocation over time. The tools that do exist apply simple static portfolio forecasting for TDFs, thus providing investors with inaccurate results on retirement goal achievability based on the current TDF asset allocation and/or current investor savings rates. These inaccurate results are compounded because they overstate the expected returns of a TDF investment strategy that will eventually become more conservative over time, and thus understate the required savings needed to achieve goals. Thus, these traditional calculators cannot provide accurate savings recommendations for investors in TDG or life-cycle investment vehicles.

A very specific retirement calculator that provides automated managed accounts solutions is described in U.S. Pat. No. 7,016,870 entitled Financial Advisory System. This system maps the available set of recommendable investments to the investor into an asset classes. It then performs a portfolio optimization to create an efficient risk/reward frontier for the investment horizon, and from this frontier picks the ideal asset class portfolio that maximizes the investor's utility function. The system then implements the investable portfolio that corresponds to this ideal asset class portfolio from the list of investible securities available to the investor.

Another very specific retirement calculator that provides automated managed accounts solutions is described in U.S. Patent Application Publication No. 2003/0172018 entitled Automatically Allocating and Rebalancing Discretionary Portfolios. This system determines the human capital of the individual as a bond, and dynamically allocates the financial capital of the person such that when combined with the human capital, the total wealth of the person achieves a desired optimal target ratio.

These prior-art retirement advice systems are designed to provide managed accounts solutions with discretionary investments that are used to create efficient portfolios, select an optimal portfolio for the individual, and offer automatic rebalancing of the discretionary investments. However, TDFs typically already consist of efficient portfolios with built-in investment advice and automatic rebalancing, and are designed for representative investors.

The mentioned prior-art advisory systems do no take into account the methodology assumptions used in creation of TDFs. First, mentioned prior-art advisory systems statically map financial investments to asset classes that limits the ability of these systems to respond to investment's that are expected to rebalance to a changing allocation to reference date. The systems then impose their own portfolio optimization with assumptions that ignore the already optimal portfolios represented by TDF investments. Due to these methodology incompatibilities, the existing advisory systems are inappropriate for providing personalized guidance and/or advice on how individual extenuating circumstances should or should not influence or compel an individual to deviate from the traditional age-based single factor assignment to a single TDF investment.

SUMMARY OF THE INVENTION

Illustrative embodiments of the present invention provide systems, methods and computer programs that enables personalized financial services including the automatic allocation to and rebalancing of reference date dependent investments based on the differences between an investor's profile and that of the representative investor used to create of reference date investment. These profile factors could include personal age, current account balances and holdings, as well as future expected account cash-flows of the investor, sto-chastic behavior of existing holdings, and goal date, target income, and risk tolerance depending on the configuration set used by the methodology publishers. The innovation provides a method for delivering personalized financial services using existing reference-date dependent investments that does not rely on mean-variance portfolio optimization or human capital methodology assumptions, nor does it relate to the actual construction of reference-date dependent investment vehicles.

We show a system in which a Director is invoked by an investor through a user interface or through a systems interface. The Director retrieves a stored investor profile and the stored methodology configuration, and hands this information along with information in the vocation request to the Automated Financial Advisor (AFA) with specific actionable requests. Based on the request type and configuration, the AFA makes a recommendation of one or more TDFs, and this recommendation is provided to the Director that can sends the implementation transactions to an investment account record keeping system to be executed on behalf of the investor.

The configuration loaded by the Director can consist of one or more capital market assumptions, simulation of financial markets, defaults of investor profile and goals, wealth to income forward annuity rates, future income and savings forecasting models/constraints, the asset allocation of existing investments and many other data elements describing methodology models details. Apart from this, the configuration includes specifics details about the TDF families including portfolio asset allocation trajectory over time with respect to reference date, or glide path(s), and if configured additional profile information about the representative investor(s) used to create the glide path(s), the assumed future asset flows and end goals and the types of profiles parameters to consider in providing guidance and/or advice. What the reference or target date means depends on the specific product type. For example, for a retirement savings fund the reference date is projected retirement year, for retirement decumulation the retirement income fund date would be an advanced age planning horizon year for a retiree to plan to receive income until, and for college savings funds the reference or target date is a projected year when expecting to need the accumulated wealth to fund college expenses.

A Director delivers to AFA a set of Monte-Carlo simulation data of the financial asset classes along with detailed investor accounts information including but not limited to balances by asset class type. The AFA loads the reference date based asset allocation glide path of a TDF family. This glide path of the asset class portfolio allocation and simulation data can be used to simulate financial behavior of any target date member of the TDF family by rebalancing the portfolio balance to the changing asset allocation over time.

If configured to do so by methodology publisher, AFA can provide TDF portfolio guidance/advice. This is accomplished by setting the reference date of a particular TDF family to the goal date of the investor. The TDF family's glide path portfolio allocations for each point in time becomes the personalized target optimal allocation and rebalancing strategy for the investor. The AFA has a portfolio tracking algorithm that allows overall wealth allocation of the investor to track the target optimal allocation for specific period. The configurations set by a methodology publisher determine the tracking algorithm, implementation used and details it considers in making the guidance/advice.

At each period, the algorithm assigns appropriate TDF(s), such that it minimizes a distance measure between total asset allocation of investments to the target asset allocation for that time period chosen from personalized glide path. The TDF represent efficient portfolios monotonically spaced in risk and return characteristics, and thus our optimization problem becomes simplified. The first configuration to consider of the completion algorithm specification is choice of n number of linear interpolated combination portfolios between the existing dated members of the TDF family that are available in the plan. This parameter could be set to zero, to only allow full allocation to one fund and only one fund. Another choice for this parameter is to use the number of gap periods between the funds as the interpolated points. For example, if the TDFs available are ten years apart, then configuration could be set to nine interpolating portfolio between two near dated funds. This set of choice portfolios is called the investable TDF set. The completion algorithm finds the TDF portfolio from the investable set such that allocation of funds in that portfolio allows the investor's overall wealth to most closely track the target optimal portfolio for that period. A second configuration to consider is the choice of which tracking distance metric to optimize, which could be a equity/fixed income ratio, the highest correlation, the minimum variance of tracking error, etc. An embodiment of this completion process is based on minimizing the variance of the tracking error of returns of the total wealth invested in investor's overall wealth portfolio and the target glide path portfolio for the date. This minimum variance completion portfolio process is described in detail herein and is repeated in each period of a simulation to track the target asset allocation trajectory to retirement date.

In a particular methodology publisher configuration, where the completion portfolio algorithm may not consider investor's outside assets or future asset flows, and the only account to consider is the tax deferred account with portfolio choice of TDF family members, the only consideration is how the investor's goal date differs from that of representative investor of each of the individual TDFs. In this case, the choice is simply the linear combination of TDFs such that the resultant portfolio tracks to the optimal target mix for the period. If the goal date of the investor happens to line up with an existing TDF date, then the investor is allocated to single fund. However, if the goal date of the investor is in between that of two funds, then a linear combination of the two near dated funds is chosen. The exact portfolio weights of the TDF allocation depends on the configured tracking algorithm. Furthermore, if for some reason the goal date of the investor is pushed back a year, because he is under-saved, then portfolio allocations between investable TDFs would appropriately adjust slightly towards the later dated fund.

In another particular methodology publisher configuration, the completion portfolio algorithm may also consider the investor's goal date and outside non-recommendable assets in providing TDF guidance/advice. In this case, the algorithm invests the recommendable wealth in the investable TDF portfolio such that the over all investor wealth portfolio that combines recommendable and non-recommendable wealth, most closely tracks the entire wealth invested in the target portfolio for the date. The choice of the investable TDF portfolio as the recommendable allocation makes the overall wealth allocation most closely track to the entire wealth target portfolio.

In a further case of the previous embodiment, the methodology provider could configure the representative investor's non-recommendable wealth fraction and its corresponding non-recommendable portfolio allocation with respect to a reference date that is baked into the constructed glide path. In this case, if the investor's information is also available for non-recommendable assets, the AFA sets the investor's target portfolio for time t to be the weighted combination portfolio of recommendable wealth invested in asset allocation glide path and corresponding fraction of wealth in non-recommendable asset allocation glide path.

In another particular methodology publisher configuration, the completion portfolio algorithm may consider an investor's recommendable assets, outside non-recommendable current financial assets, as well as affects of future expected assets flows in providing TDF guidance/advice to track the investor's target portfolio for each time period. The reason to consider future expected assets flows is that these assets are likely to materially affect the retirement needs of the investor, and not taking them into account would result in suboptimal financial guidance/advice. For example, the investor can provide information about expected defined benefit income, annuity income, 401(k) defined contribution account loans, inheritance and other various types of ad-hoc asset flows along with associated asset class types for each expected flow. The shadow of these future assets is reflected at each period t as a non-recommendable non-tradable portfolio with allocations derived from discounted mortality probability weighted Net Present Value (NPV) of the asset flows. The total non-recommendable wealth is thus a combination of the current financial assets as well the NPV portfolio. This recommendable TDF investment is chosen such that when combined with the existing non-recommendable portfolio, the total wealth portfolio most closely tracks the target portfolio for the investor at period t.

In a further case of the previous embodiment, the methodology publisher configures the representative investor's future NPV of future assets for each time period that was used to construct the TDF glide path, so it can serve as an anchor for providing guidance/advice when considering an individual's NPV cash-flows. In this embodiment, the methodology provider has to configure the representative investor's non-recommendable NPV portfolio allocation glide path with respect to the reference date and the corresponding fraction of total wealth it represents. The target portfolio for time period t, is calculated from the investor's wealth distributed using the representative investor's allocation to the recommendable asset allocation glide path, the non-recommendable tradable asset allocation glide path, and the non-recommendable NPV portfolio glide path each with respect to reference date. Using the aforementioned, the portfolio completion algorithm recommends the investable TDF portfolio such that the overall investor portfolio wealth that combines the wealth from the recommendable financial portfolio, the non-recommendable financial portfolio and the non-recommendable NPV portfolio at period t, most closely tracks the entire wealth invested in the selected target portfolio for the time period t.

If configured to do so by a Methodology Publisher, this forecast simulator can be then be used with a combination of optimizers to provide recommendations on, among other things, one or more savings rate(s), retirement age, withdrawal rate, and the appropriate choice of dated fund(s) to pick from a family of TDFs. The simulation engine can take into account, among other things, salary, pre-tax, post -tax and Roth contributions, cash investment basis, other asset flows, expenses, withdrawals, state and federal taxes, rules about various account types and plan structures such as employer contribution match formulas as it simulates forward and grows wealth in each account bucket.

The financial services this innovation enables can also include illustration, guidance and advice on insurance and annuity products that bundle on top of Target Date investments for wealth accumulation and spend down purposes. If configured by a Methodology Provider, the forecast simulator can simulate a range of variable annuities underlying a portfolio having a reference date glide path. These annuities could have various payout options, such as immediate and deferred, survivor provisions and may have guarantee features such as premium protection or income protection.

An advantage of this system is that the automated financial advisor provides an independent financial consultant a system that seamlessly turns traditional TDFs products, into a sophisticated suite of retirement services offerings that overcome the shortcomings of the TDF product. It provides powerful illustrations of the impact of TDF investments for securing retirement. Further, the service no longer keeps the individual tied to a "one size fits all" TDF solution by tailoring the solution to an individual's facts and circumstances based on set of configuration options enabled by the methodology publisher.

In accumulation embodiments, the Director invokes AFA that returns the recommendation of the guidance/advice on TDF portfolio allocation, savings recommendations, and goal age. In an illustrative embodiment, the AFA output could be used by Director as instruction for trade orders for purchase and rebalance of the actual TDF(s) and instructions for record keeping systems to alter investor's savings contributions. In one embodiment, the TDF allocations could serve as asset class guidance for illustrative purposes for the investor. In another embodiment, the AFA's recommended TDF asset class recommendation can be consumed by an external automated investment manager(s). The investment manager(s) uses the recommended asset class portfolios as benchmarks then builds tracking portfolios of available discretionary investment managers available inside the defined contribution plan or in the brokerage account. This embodiment solves problem of multi-account advice where the TDF family that served as methodology foundation for AFA advice may not be available across all the recommendable accounts of an individual.

BRIEF DESCRIPTION OF THE DRAWINGS

The foregoing and other features and advantages of the present invention will be more fully understood from the following detailed description of illustrative embodiments, taken in conjunction with the accompanying drawings in which.

DETAILED DESCRIPTION

Figure 1A:
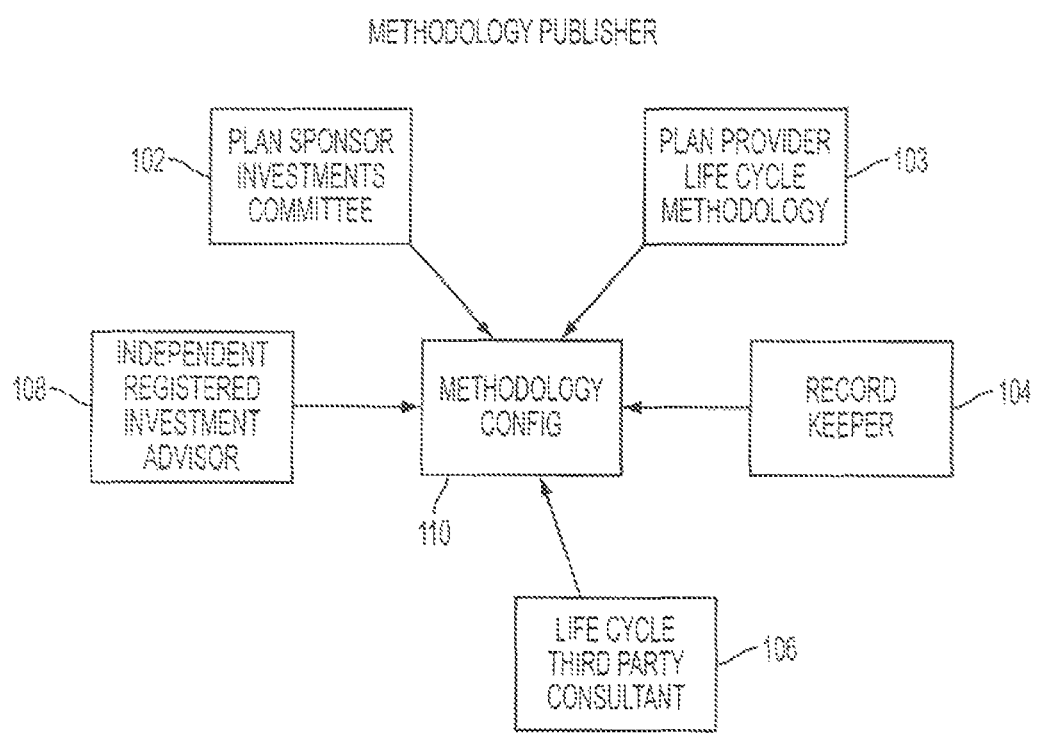
FIG. 1A is a flow diagram showing input to a Methodology Configuration.

In an illustrative embodiment of the invention, a personalized financial illustration, guidance and advisory system for reference-date dependent investments has been abstracted from methodology through a published interface. Referring to FIG. 1A, the term "Methodology Publisher" is used herein to describe a publishing entity which could include one or more party such as a plan sponsor 102, a provider of Target Date methodology 103, a record keeper 104, a third party consultant 106 or an independent Registered Investment Advisor (RIA) 108, for example. The role of an RIA 106 is further described herein with reference to FIGS. 2, 8 and 9.

Figure 1B:
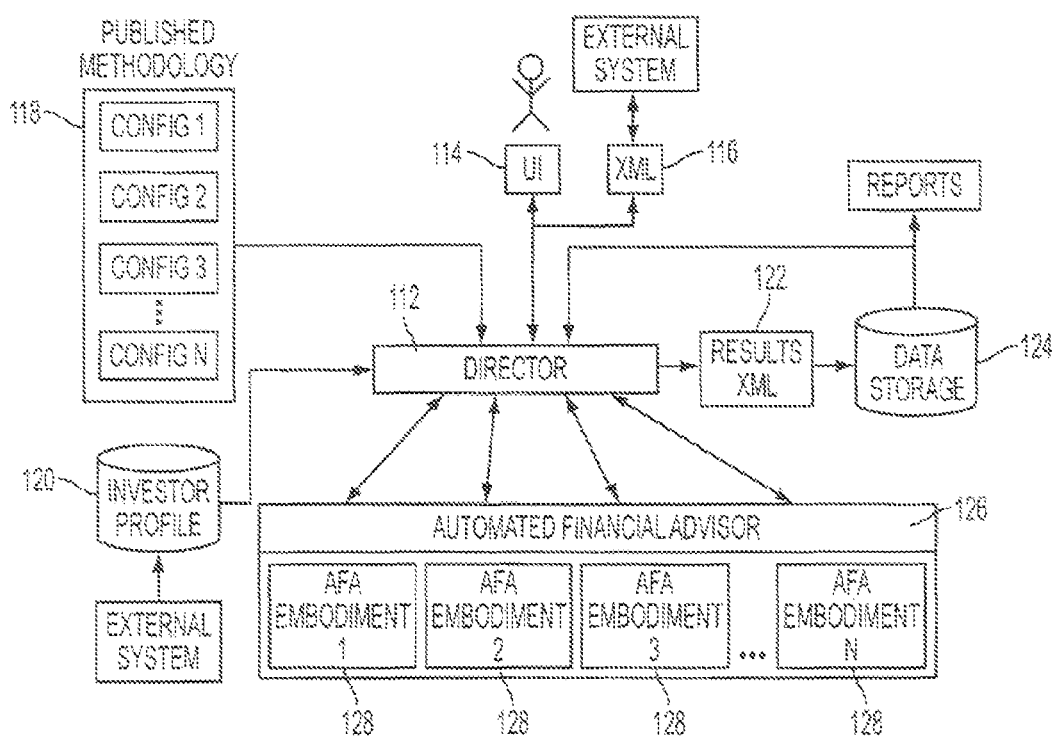
FIG. 1B is a high level system block diagram showing interrelationship of components in the various illustrative embodiments of the invention.

An interaction according to an illustrative embodiment of the invention is described with reference to FIG. 1B. The execution of a system Director 112 is invoked by through an investor user interface 114 or in an off-line mode through an xml interface 116. The Director 112 retrieves the sets of configurations, including the published methodology 118, investor profile 120, and previously saved guidance/advice results 122 from data storage 124. The Director 112 then passes the invoker's request and accompanying configuration to the Automated Financial Advisor (AFA) 126 that executes embodiment of the system 128 depending on the combination of the methodology configuration 118 and investor profile 120. The results from AFA 126 are sent back to the invoking entity as reports 130 and/or stored in data storage 124 for retrieval for future invocation by Director 112 and also for reporting purposes.

Methodology Configuration

In the illustrative embodiment, the AFA system receives methodology configuration information from a Methodology Publisher that is published in a common format such as XML, for example. This published configuration 110 allows the methodology to be fully provided by an external party or partially constructed through supporting configuration system. In one embodiment, the Methodology Publisher could be a TDF manager or a consultant firm that has built a custom Target Date glide path for a plan sponsor. In this embodiment, the Methodology Publisher may only provide savings recommendations without dynamic fund allocation guidance/advice, for example. In another embodiment, the record keeper can be a Methodology Publisher that hires an independent RIA to provide the capital market assumptions and provide configuration of savings, retirement age and portfolio switching methodology. However, each TDF family covered by the centralized record keeper publishes its own set of construction assumptions and reference date based asset class rebalancing strategy. The record keeper can then "turn-on" support for various combination of methodologies and TDFs based on a level of financial services offered to particular plan sponsor.

A Methodology Publisher can configure or upload its recommended investment strategy for at least one representative investor. These recommended investment strategies then serve as a default strategy for that Methodology Publisher. A Methodology Publisher can further specify how a personalized, investor-specific investment strategy would differ from the representative investment strategy based on how various characteristics of the individual differ from that of the representative investor.

This mechanism allows a Methodology Publisher to tie a level of personalization in the guidance and advice services to a level of service provided to a retirement plan sponsor, for example. The Methodology Publisher may be compensated accordingly for their value added services. Further discussion of the service levels are detailed herein.

Methodology Configuration Overview

A Methodology Configuration according to an illustrative embodiment of the invention allows Methodology Publishers to automate and scale the creation of investment management processes to support various levels of financial services for Target Date products. The methodology configurations can then be used by the AFA system to implement various embodiments of the invention.

A published configuration may be selected by a Director and handed to a specific instance of the AFA system to accomplish run time forecasting and optimization for an individual investor based on the Methodology Publishers' specified methodologies.

Capital Market Assumptions

A Methodology Configuration generally requires one or more Classification Benchmarks that provide a mutually exclusive and exhaustive asset class benchmarks. The asset class palette has a set of corresponding capital market assumptions, with its expected returns and covariance matrix. In one embodiment the palette consists of 4 asset classes: cash, bonds, US stocks and international stocks. However, typically a palette is expected to range from 5 asset classes to over 15 with very granular, detailed asset class benchmarks. The equity benchmarks could also be a benchmark of industry sectors instead of detailed asset classes, for example.

Style Analysis and Benchmark Classification

The Methodology Configuration also generally requires a style classification of all public and private investments in terms of the chosen asset class benchmarks. A common approach to performing investment style analysis uses William Sharpe's Returns Based Style Analysis (RBSA) method. RBSA uses quadratic optimization to minimize the variance of the excess return of the manager over a linear combination of the style benchmarks. EQUATION 1 (See Appendix) provides description of basic returns based style analysis. This provides an estimation of style strategy that can be used to create a foreword looking goal projection estimate of the investor's status quo investment allocation.

Monte Carlo Simulation Generation

In the illustrative embodiment, the Methodology Configuration includes a Monte Carlo Simulation of the financial asset class benchmarks. The simulation data consists of n simulation runs, and in each run sample returns for the benchmark asset classes for specified time periods T. In our embodiment, the process used to generate the simulation data is abstracted, and it could be generated from a number of processes or supplied by a Methodology Provider. This processes include but is not limited to bootstrap resampled from history of benchmark returns, multivariate Guassian with independent and identically distributed (i.i.d.) returns, or a much more complex forecasting model such as one that is macroeconomics driven with arbitrage-free, time-dependent expected returns with a time varying volatility structure with conditional copula joint dependence structure. The simulation data stored is used by the AFA for investor-specific scenario forecasting. In an illustrative embodiment of the invention, the AFA system loads the simulation returns of the financial asset classes, along with details about simulated dividend, interest income and capital gains, for example.

Other Configurations Settings

The Methodology Configuration also may include pricing tables and model configuration to convert a simulated distribution of wealth at retirement date into a corresponding distribution of sustainable life long income, typically through the purchase of a synthetic inflation protected annuity, for example. The Methodology Configuration may also contains piece-wise linear social security benefits estimates model parameters, expected inflation rates, mortality tables and tax brackets, for example.

Target Date Mutual Fund Provided Configuration

According to the illustrative embodiments of the invention, a target date methodology can be configured with three layers of abstraction that can turn on increasing levels of customizing guidance/advice.

Figure 2:
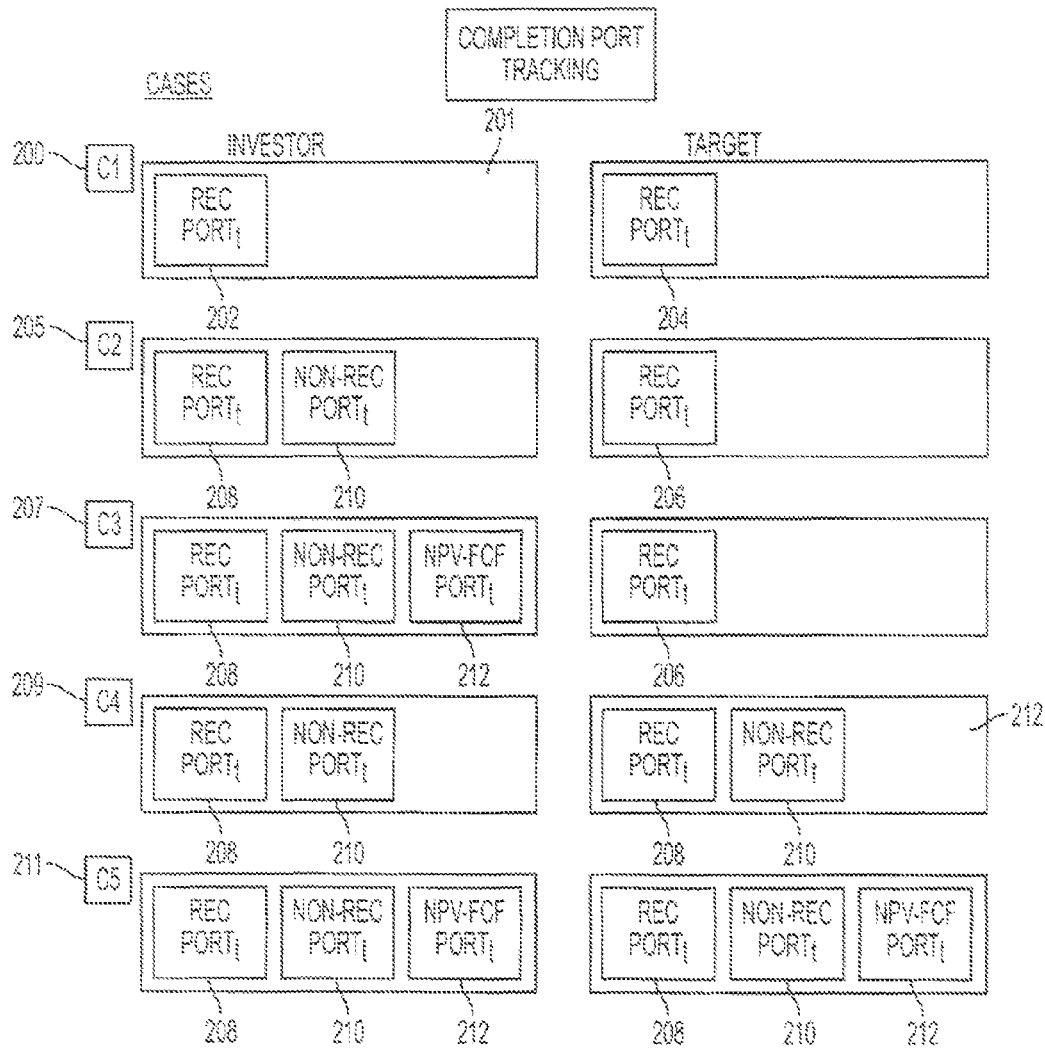
FIG. 2 is a diagram showing various portfolio glide paths and target glide paths for various cases of Methodology Configurations according to illustrative embodiments of the invention.

Referring to FIG. 2, in a first case 200, a Methodology Configuration 201 generally includes at least a TDF portfolio allocation glide path 204 with respect to the reference date. The Methodology Configuration 201 may be provided by the TDF manager or may be approximated for any TDF family if their history of returns are available by using a Glide Path Style Analysis (GPSA) process, that is the subject of Applicant's co-pending U.S. patent application Ser. No. 12/437018 filed on May, 7, 2009 entitled Benchmark and Evaluation of Reference Date Dependent Investments which is hereby incorporated by reference. This target asset allocation glide path 204 is used as the recommended portfolio allocation 202 for the investor for each period.

In a second illustrative case 205 and a third illustrative case 207 an asset allocation glide path 204 can also be used as the target for total wealth portfolio of the investor. This total wealth includes the investor's recommendable financial assets 208, non-recommendable financial assets 210 and non-recommendable NPV of future portfolios 212.

A fund manager may optionally provide more details of a representative investor's profile that was used to create the TDFs and how their allocation mix is expected to change with respect to the reference date. Such additional details can allow further personalization of guidance/advice based how individual's circumstances differs from that of the representative investor. The methodology provider could configure a recommendable asset allocation glide path with the possible addition of n sub-account asset allocation trajectories to reference date corresponding to specific types of non-recommendable sub-accounts under consideration. Along with this, the provider could configure an additional wealth allocation trajectory with respect to the reference date that provides the relative fractions of total wealth, or absolute value of wealth corresponding to the non-recommendable sub-account types considered for representative investor.

In a fourth illustrative case, 209, if an investor's profile also contains details about outside non-recommendable financial accounts 210, the Methodology Provider can specify that additional information be used for the target portfolio. In the illustrative embodiment, the Methodology Provider can provide information about the non-recommendable portfolio glide path and the fraction of total wealth that the non-recommendable portfolio represents with respect to the reference date 214. In this case the target portfolio for each period becomes the capital weighted sum of the recommendable portfolio glide path and the non-recommendable portfolio glide path. As an example, an investor profile with a working spouse or significant amount of non-recommendable financial assets could trigger the consideration of the representative investor's non-recommendable portfolio glide path 214 in the target portfolio.

In a fifth illustrative case 211, if the investor's profile also contains details about future asset flows of the investor, such as defined benefits, annuities, inheritance, the methodology provider can specify that additional information be used for target portfolio 215. In the illustrative embodiment, the Methodology Provider can configure a non-recommendable shadow Net Present Value(NPV) portfolio glide path that reflects the discounted present value of future asset flows, and also specifies the fraction of total wealth that the non-recommendable NPV portfolio represents with respect to the reference date 216. In this case, the investor's appropriate target portfolio for each period becomes the capital weighted sum of the recommendable portfolio glide path 204, the non-recommendable financial 214 and NPV portfolio glide paths 216. As an example, an investor profile with a significant NPV portfolio resulting from defined benefit future income could trigger consideration of representative investor's non-recommendable NPV portfolio glide path in a target portfolio.

Automated Financial Advisor

An Automated Financial Advisor (AFA) system according to an illustrative embodiment of the present invention is a methodologically configurable, investor scenario-specific forecasting and recommendation/advice engine runtime software component that takes as input one or more published methodology sets from a Director.

Figure 3A:
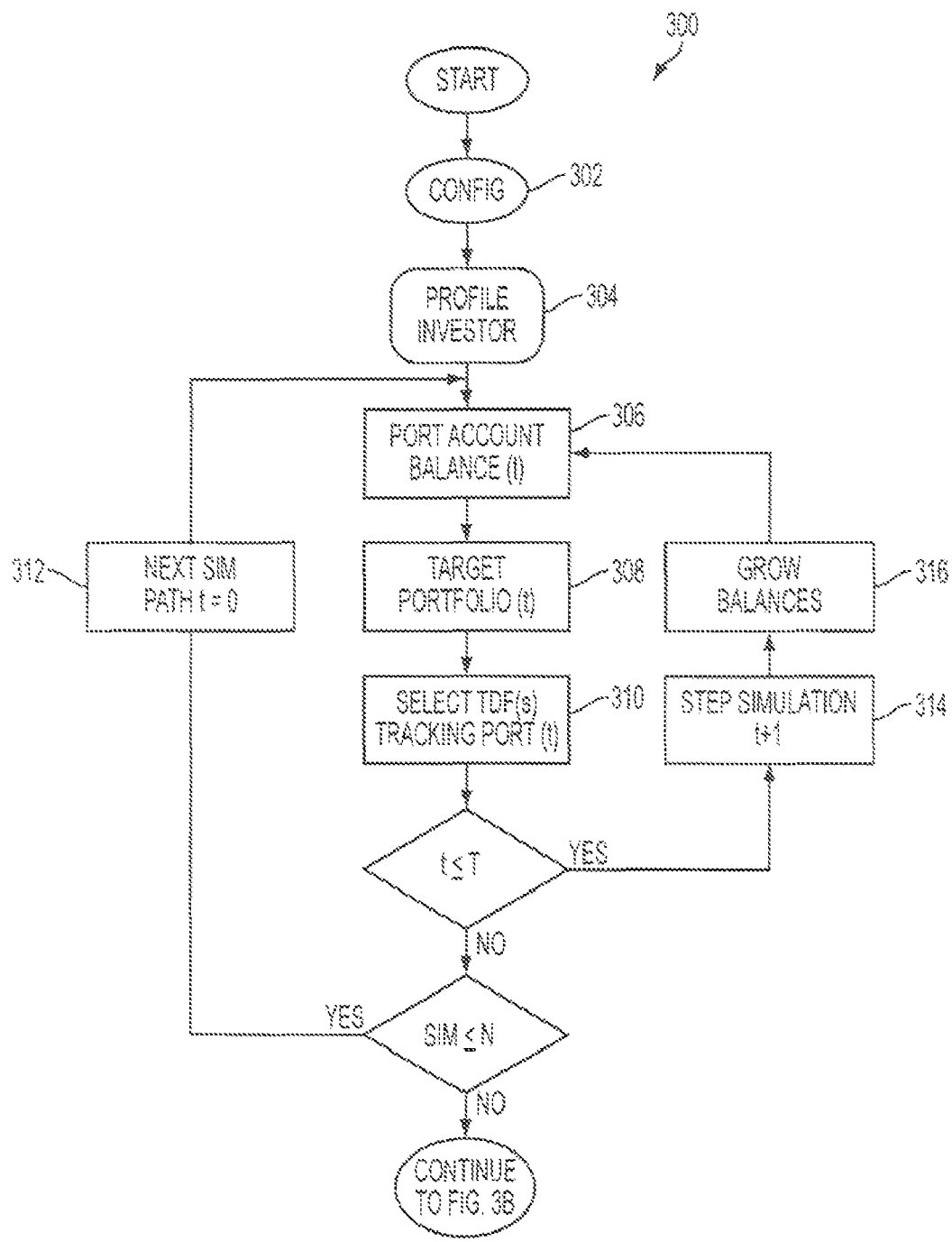
FIG. 3A is a process flow diagram showing steps performed by a simulation engine portion of an AFA according to an illustrative embodiment of the invention.
Figure 3B:
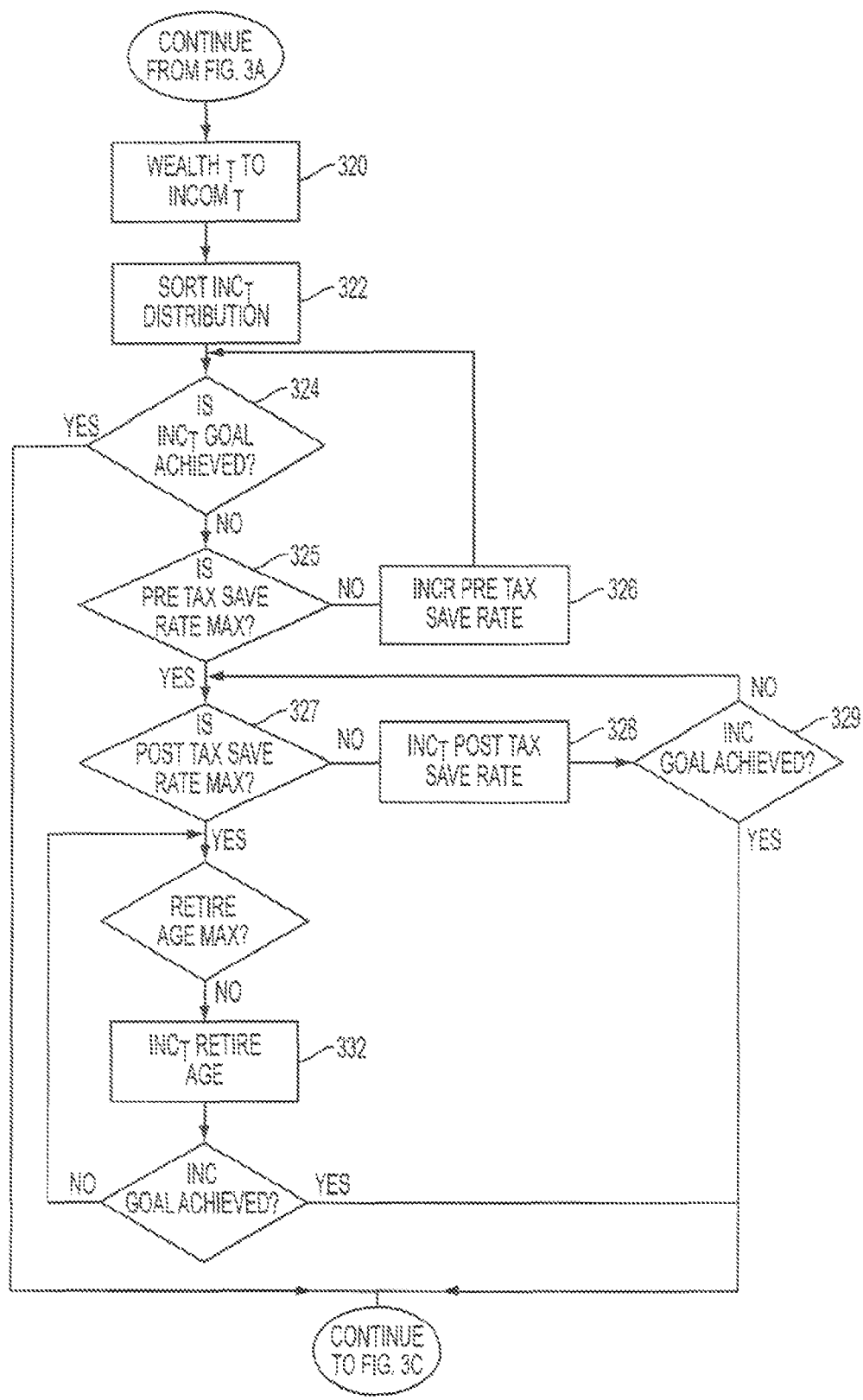
FIG. 3B is a process flow diagram showing steps performed by an optimizer portion of an AFA according to an illustrative embodiment of the invention.
Figure 3C:
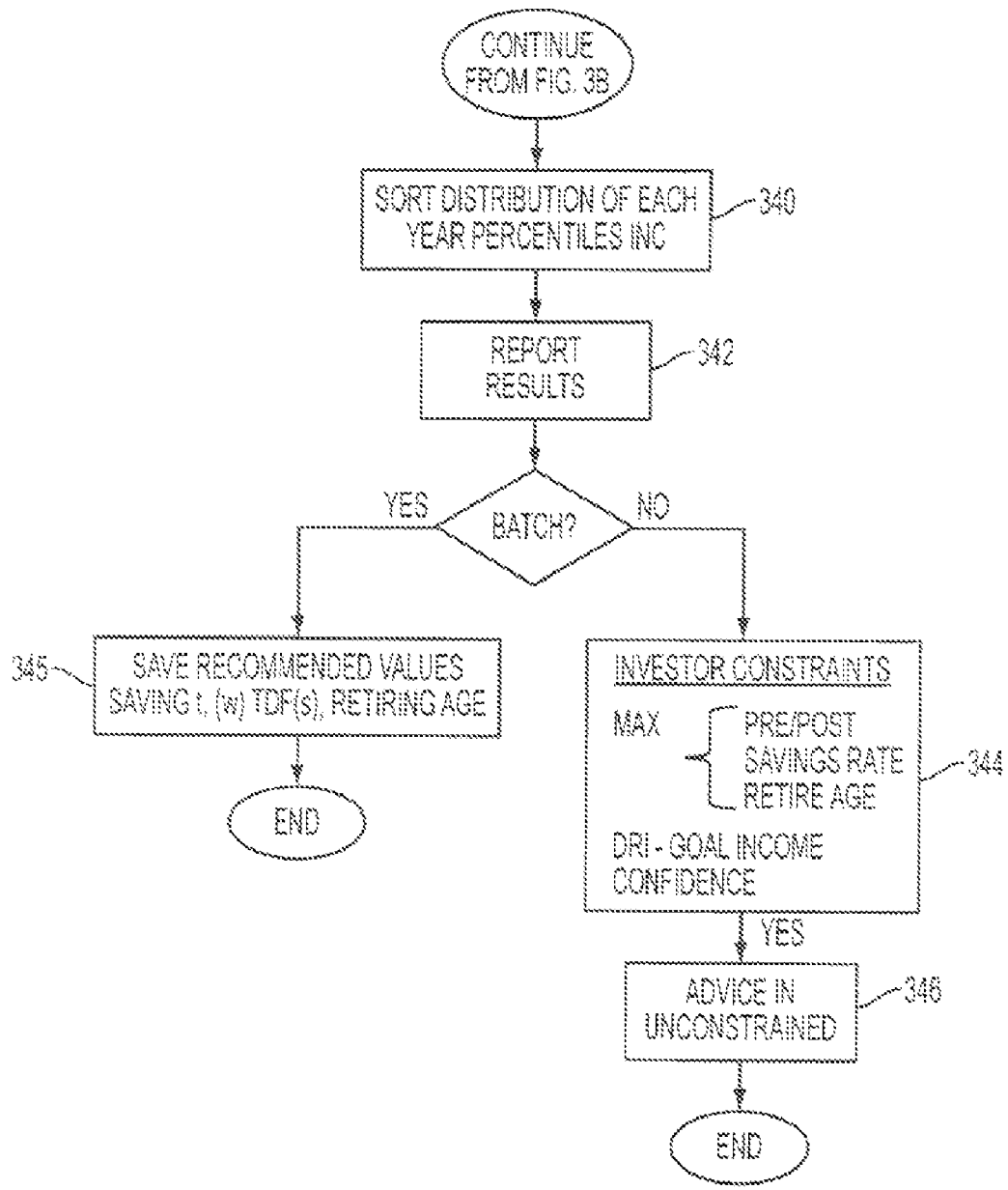
FIG. 3C is a process flow diagram showing steps performed by an output portion of an AFA according to an illustrative embodiment of the invention.

A simulation performed by an illustrative AFA system according to an embodiment of the present invention is describe with reference to FIGS. 3A-3C.

Referring to FIG. 3A, AFA loads the methodology configuration 302, and the investor profile 304, and then performs the forecast simulation. The system starts by loading existing account balances by asset classes 306, and loads the target portfolio for the time period (t) 308, and uses the completion portfolio algorithm to select one or more TDF(s) 310. For a simulation path the system steps through each time period 314 and grows the account balances according to the simulation market returns of the asset class mix of the account in the period 316. The system then iterates through each simulation path 312.

Selection of a TDF(t) and tracking port (t) is further described below with reference to FIG. 9.

Referring to FIG. 3B, simulated wealth at retirement is converted 320 into an income distribution with EQUATION 4 (See Appendix), and added with income from tax deferred and advantaged accounts, as well as income from taxable accounts. Finally the combined income sources are taxed at the appropriate rate(s) with EQUATION 5 (See Appendix), to calculate the take home income at the appropriate confidence EQUATION 6 (See Appendix).

The income distribution is then sorted 322. If an income goal is not achieved 324 and the investor's pre-tax savings rate is not maximized 325 then tax deferred pre-tax savings is increased 326 until the income goal is achieved or until pre-tax savings is maxed out. If the income goal is still not achieved 324 and the investor's pre-tax savings is maximized 327 then tax deferred post-tax savings is increased 328 until the income goal is achieved or until the investor's tax deferred post-tax savings is maxed out. If the income goal is still not achieved 329 then taxable post-tax savings (not shown) is increased until the income goal is achieved or until the investor's taxable post-tax savings is maxed out. If income goal is still not achieved then retirement age is increased 332 until the income goal is achieved or until retirement age is maxed out.

Referring to FIG. 3C, the system sorts the investor's income distribution at multiple percentiles, for the final period and wealth growth at intermediate periods 340. Results may then be reported 342. If investor wants to constrain certain variables, then an option to customize guidance/advice 344 is provided to rerun the process in constrained guidance/advice mode or accept guidance/advice from the unconstrained mode 346. Output such as recommended values such as savings rates, TDF recommendations, etc. may be saved 345 for future use.

Figure 4:
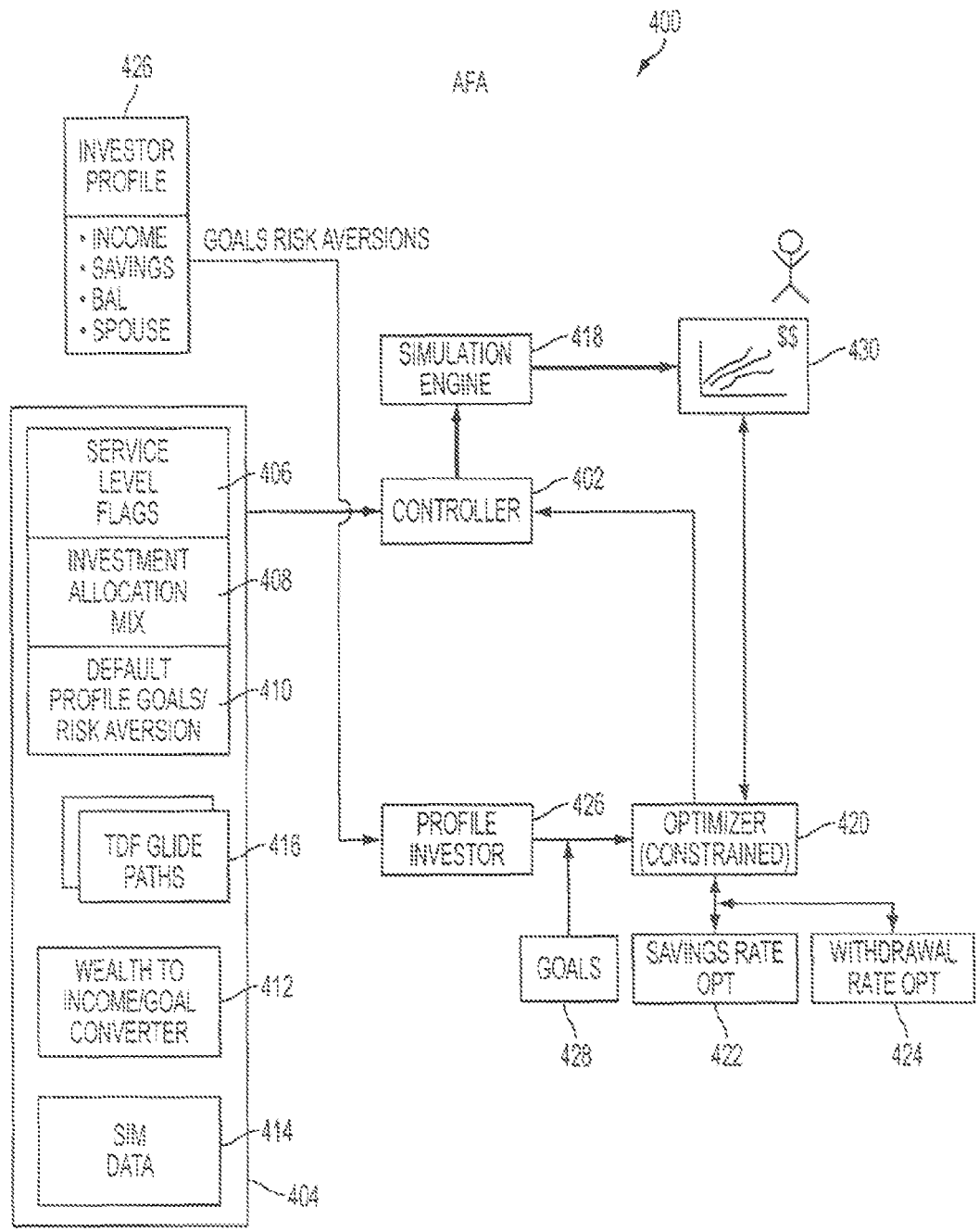
FIG. 4 is flow diagram of an AFA according to an illustrative embodiment of the invention.

An illustrative embodiment of a AFA is described with reference to FIG. 4 System 400 includes a controller 402 which receives configuration data automatically from Director 404. The configuration data includes service level flags 406 to specify system embodiments, style allocation mix of all investments 408, default profile goals and risk aversion 410, wealth to income outcome conversion 412, simulation data 414, and TDF methodology details 416. A simulation engine 418 in communication with controller 402 performs a simulation as described above with reference to FIG. 3A. An optimizer 420, in communication with controller 402 receives a profile 426 and goals 428 and performs steps as described above with reference to FIG. 3B to provide savings rate optimization 422 and withdrawal rate optimization 424, for example. Results 430 can be provided to the investor as described above with reference to FIG. 3C.

Figure 4A:
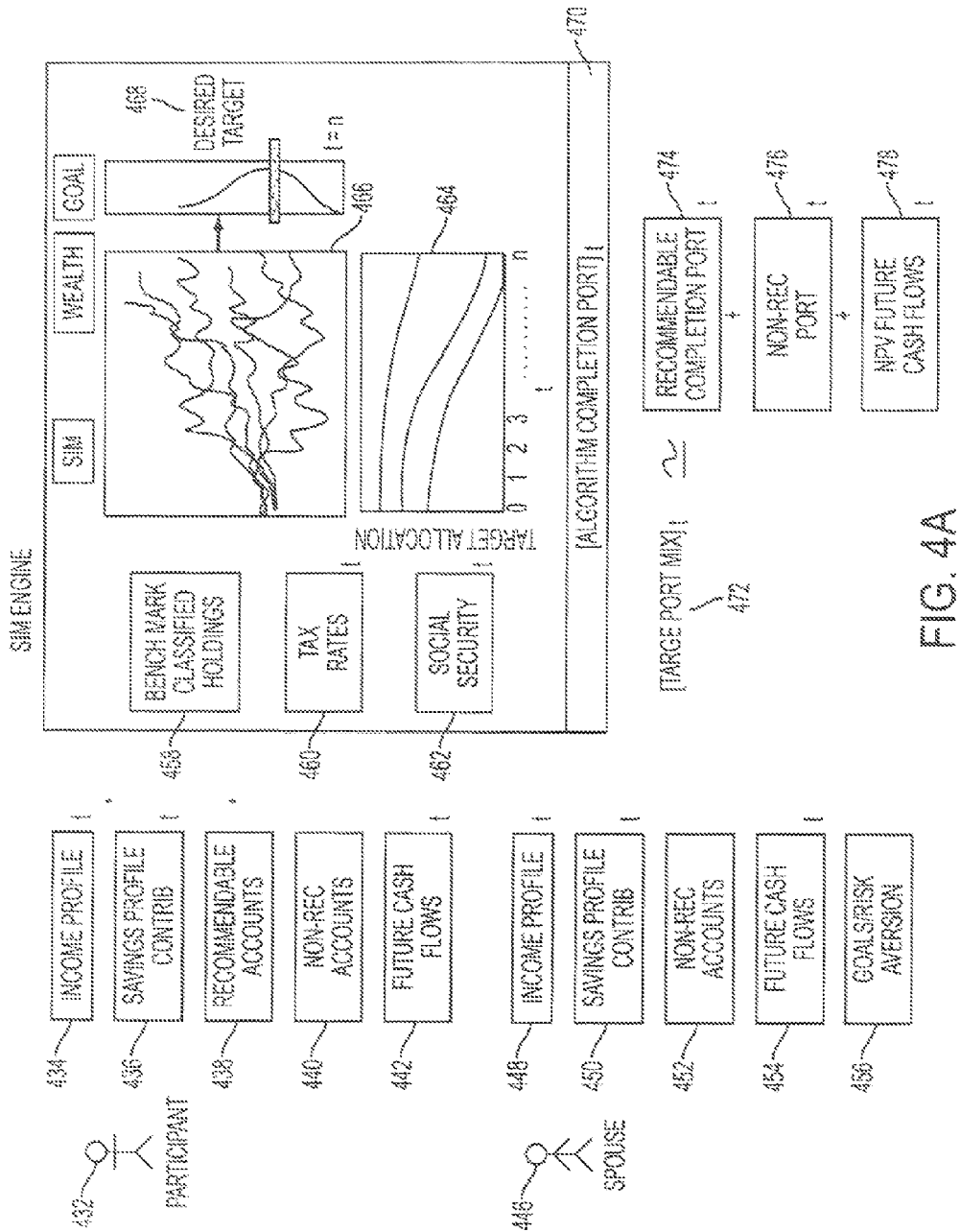
FIG. 4A is block diagram showing operation of a Simulation Engine according to an illustrative embodiment of the invention.

The simulation engine 418 is described in more detail with reference to FIG. 4A in which a investor 432 may have an income profile 434, a savings contribution profile 436, recommendable accounts 438, non-recommendable accounts 440 and future asset flows 442. The investor's spouse 446, may have an income profile 448, a savings contribution profile 450, non-recommendable accounts 452, and future asset flows 454. The investor 432 and spouse 446, have investment goals and risk aversions 456. Based on benchmarking of classified holdings 458, tax rates 460 and social security 462, the simulation can provide target allocation glide-paths 464, wealth projections 466 as related to a desired target 468. An completion portfolio algorithm 470 provides a target portfolio mix 472 which may include some combination of a recommendable completion portfolio 474, a non-recommendable completion portfolio 476, and net present value of future asset flows 478, for example.

Figure 4B:
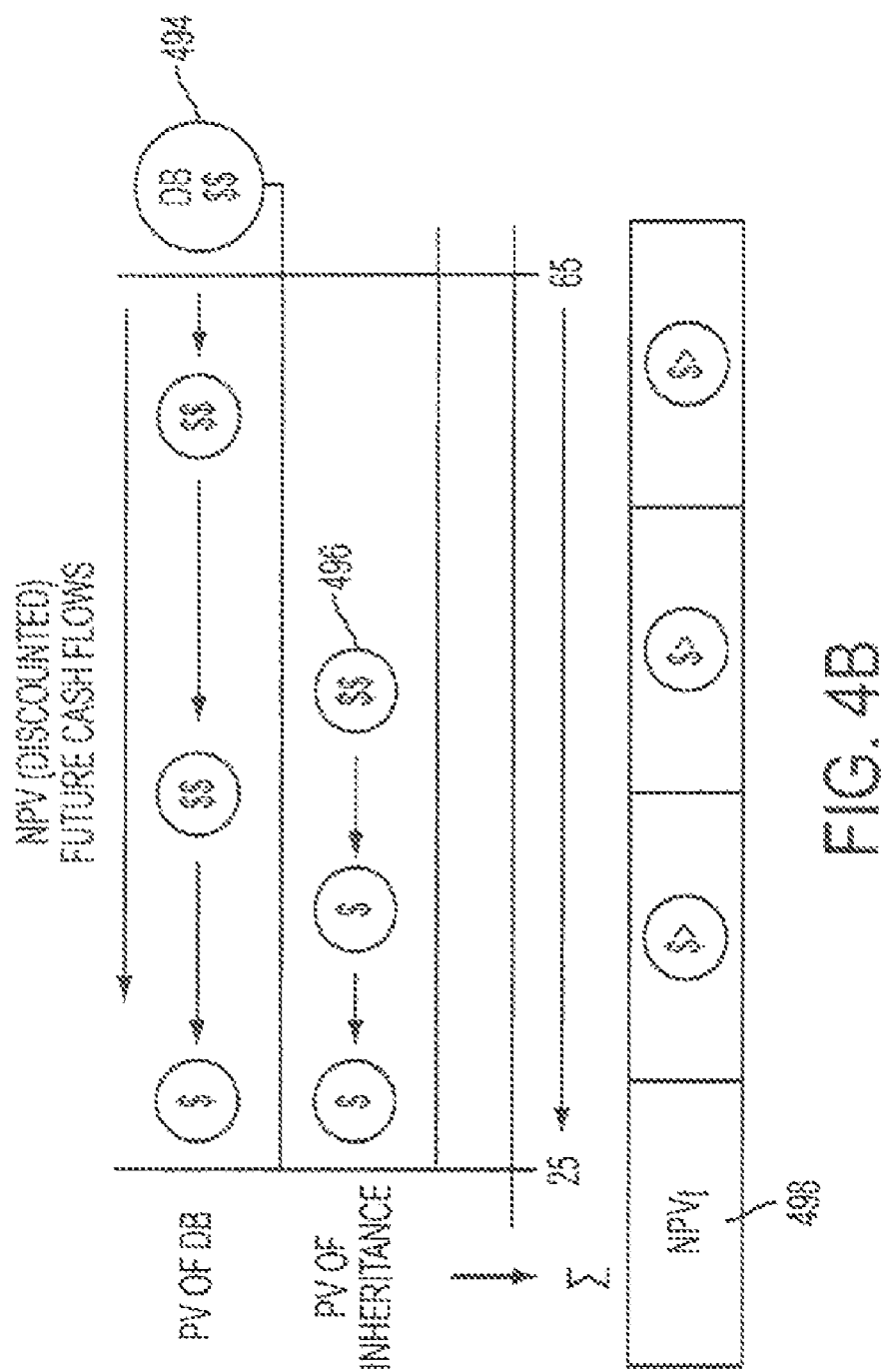
FIG. 4B is diagram of discounted future cash flows as used in various embodiments of the present invention.

The investor's extenuating circumstances may also include expectations of future asset flows that materially impacts their retirement needs, and thus these future asset flows need to be taken into account in the guidance/advice provided at time period prior to the event. FIG. 4B shows the Net Present Value of future asset flows is calculated for each asset flow and then summed to a NPV portfolio for each point in time EQUATION 7 (See Appendix). To take into account future asset flows, the algorithm first calculates the net present value at time t each of plurality asset class future flows. The configurations specifies the mortality probability weighting and types of cash-flows that can be considered, and the type of asset classes they are represented by in applying the appropriate discount factor, to calculate value backwards in time for consideration in portfolio completion at each time t. For example, the investor can provide information about expected Defined Benefits 494 at retirement represented to be discounted as a Government bond, and ad-hoc asset flows from inheritance of a house 496 to be discounted as REIT asset class. The methodology provider can specify the default asset class mix representation of each type of common future asset flow occurrence, or could require the investors to specify the effective asset class type. Based on the effective asset class mix, the system can calculate the effective mixed discount rate to derive their present value at time t of each future asset flow, and derives the NPV portfolio 498 for each time t.

Figure 4C:
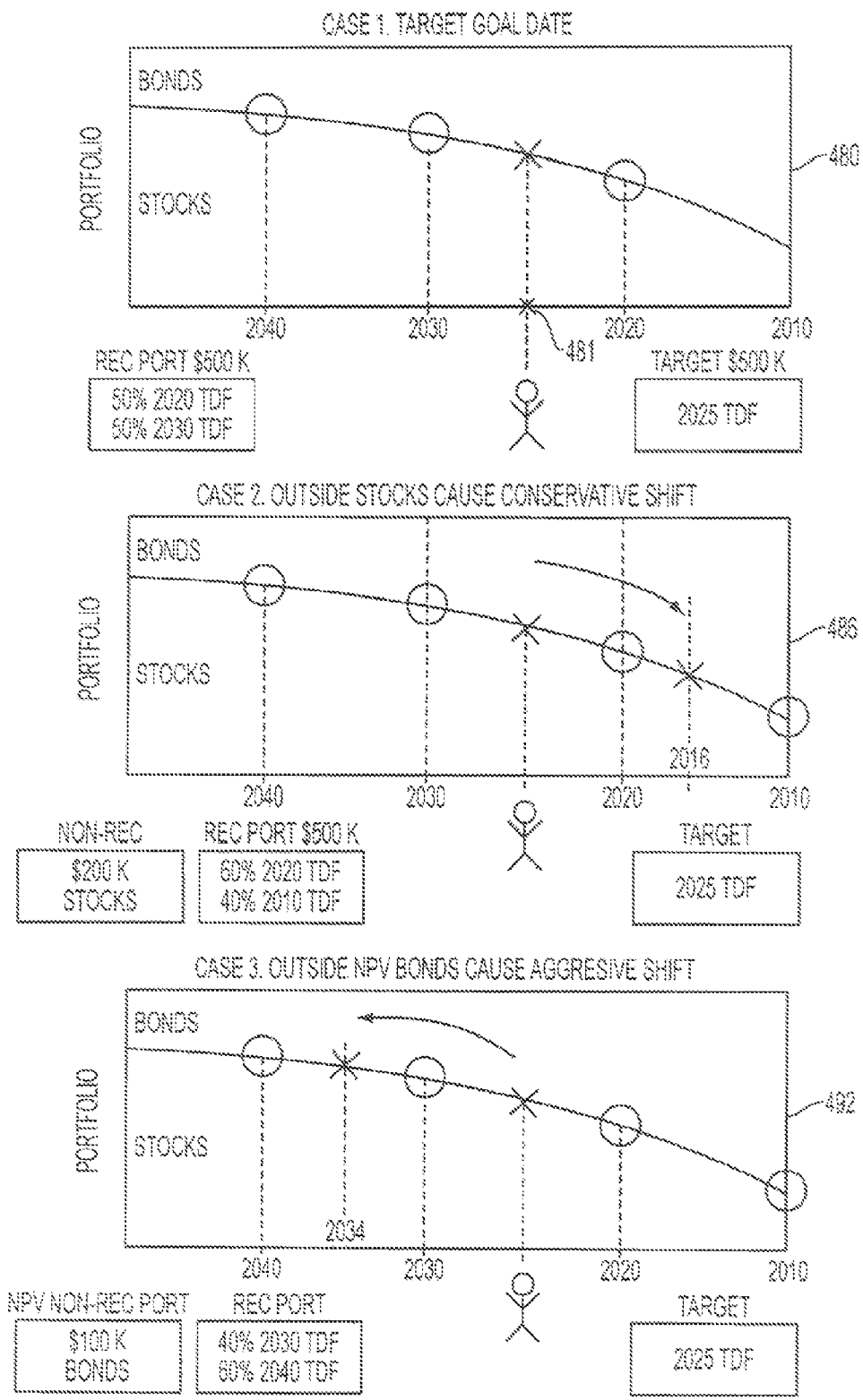
FIG. 4C is diagram showing three cases which provide further description of AFA of portfolio guidance/advice according to an illustrative embodiment of the invention.

FIG. 4C shows three cases which provide further description of AFA portfolio guidance/advice according to an illustrative embodiment of the invention.

In a first case 482, an investor's retirement date sets an anchor 481 for a personalized financial glide path. The methodology provider has configured the system to consider only tax deferred recommendable assets for guidance/advice such that the total wealth has to track the personalized financial glide path to the investor's target date. The investor's target date is 2025, if there were a 2025 TDF it would get selected. However, the investable TDFs are the 2010, 2020,2030 and 2040 dated investments. The methodology provider has configured a number of interpolating portfolios between the investment dates. The completion portfolio algorithm recommends portfolio composition of 50% 2020 and 50% 2030 TDFs to create an effective 2025 TDF mix for the investor, for example.

In a second case 486, the consideration of excess risk taken in an outside portfolio causes a conservative shift in the current recommendable portfolio. The same first case investor is considered, but the methodology provider now configures the system to consider both tax deferred recommendable assets as well as non-recommendable financial assets, such that the total wealth has to track the personalized financial glide path. The investor's personal target date is still 2025, but he holds a significant position in non-recommendable a equity mutual fund. The completion algorithm shifts the recommendable wealth to 2016 mix portfolio such that when combined with the existing non-recommendable stocks wealth, the total combined wealth portfolio of the investor would most closely track the 2025 target portfolio. The completion portfolio algorithm thus recommends a portfolio composition of 60% 2020 and 40% 2010 TDFs to create an effective 2016 TDF mix for the investor, for example.

In a third case 492, the consideration of a secure future defined benefit pension income causes a more aggressive shift in the current recommendable portfolio. The same first case investor is considered, but the methodology provider now configures the system to consider both tax deferred recommendable assets as well as non-recommendable future assets, such that the total wealth has to track the personalized financial glide path. The investor's personal target date is still 2025, but he expects a significant future asset in-flow that will materially impact his retirement income needs. This stream of asset-flows is mortality probability weighted and discounted back to the present time t with the asset class specific discount factor. In this case, the asset is a defined benefit that is represented as a bond in-flow, and accordingly discounted back to present with the bond discount factor. This is represented as a non-recommendable future bond position at present time t. The completion algorithm shifts the recommendable wealth to an aggressive 2034 portfolio such that when combined with the existing non-recommendable future wealth, which is mostly bonds in this case, the total combined wealth portfolio of the investor would most closely track the 2025 target portfolio. The completion portfolio algorithm thus recommends a portfolio composition of 40% 2040 and 60% 2030 TDFs to create an effective 2034 TDF for the investor, for example.

Figure 5:
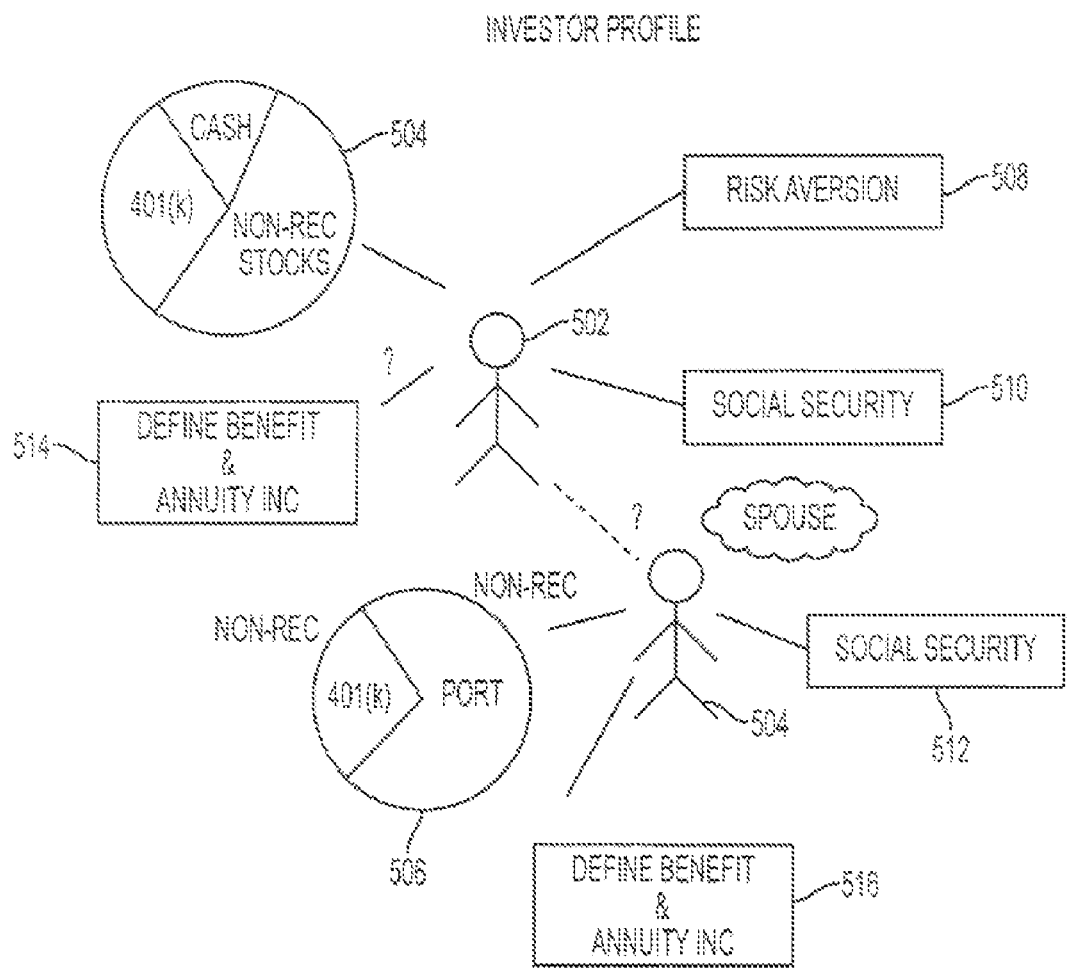
FIG. 5 is a diagram illustrating a typical investor profile according to an illustrative embodiment of the invention.

An illustrative investor profile is described with reference to FIG. 5 in which system process receives data automatically and manually from individual investors 502 and groups of investors, such information is typically received as part of corporate defined contribution plan, for example, and includes existing balances 504, savings contribution rates (not shown), spouse information 518 and information about future asset flows, and default overrides on goals and other constraints. Other information received may include an investor's risk aversion 508, social security information 510, spouses social security information 512 defined benefit and annuity income of the investor 514 and of the investor's spouse 516, for example.

In the illustrative embodiment, investor holdings portfolios are converted into their component classification benchmark weights using the style allocation of each investment to setup initial account balances and start a simulation. Each simulation runs steps through all time periods for each simulation run. The target portfolio is calculated for time t. The target portfolio depends on the glide path methodology configuration as well as the corresponding data set available in the investor's profile.

One or more TDF(s) are selected that when combined with investor's non-recommendable wealth, best track for the target portfolio for time t. The simulation steps are processed by growing financial assets balances appropriately for tax deferred pre-tax, tax deferred post-tax and taxable post-tax accounts with appropriate contributions and employer match.

Portfolio Recommendation

At each period, the system chooses a single optimal mix from the investable TDF sets such that a distance measure is minimized between total asset allocation of investment to the target asset allocation of the glide path for that time period.

Investable TDF set

The first configuration to consider of the Portfolio Recommendation algorithm specification is choice of n number of linear interpolated combination portfolios between existing dated members of the TDF family that are available to create the investable TDF sets.

Figure 6:
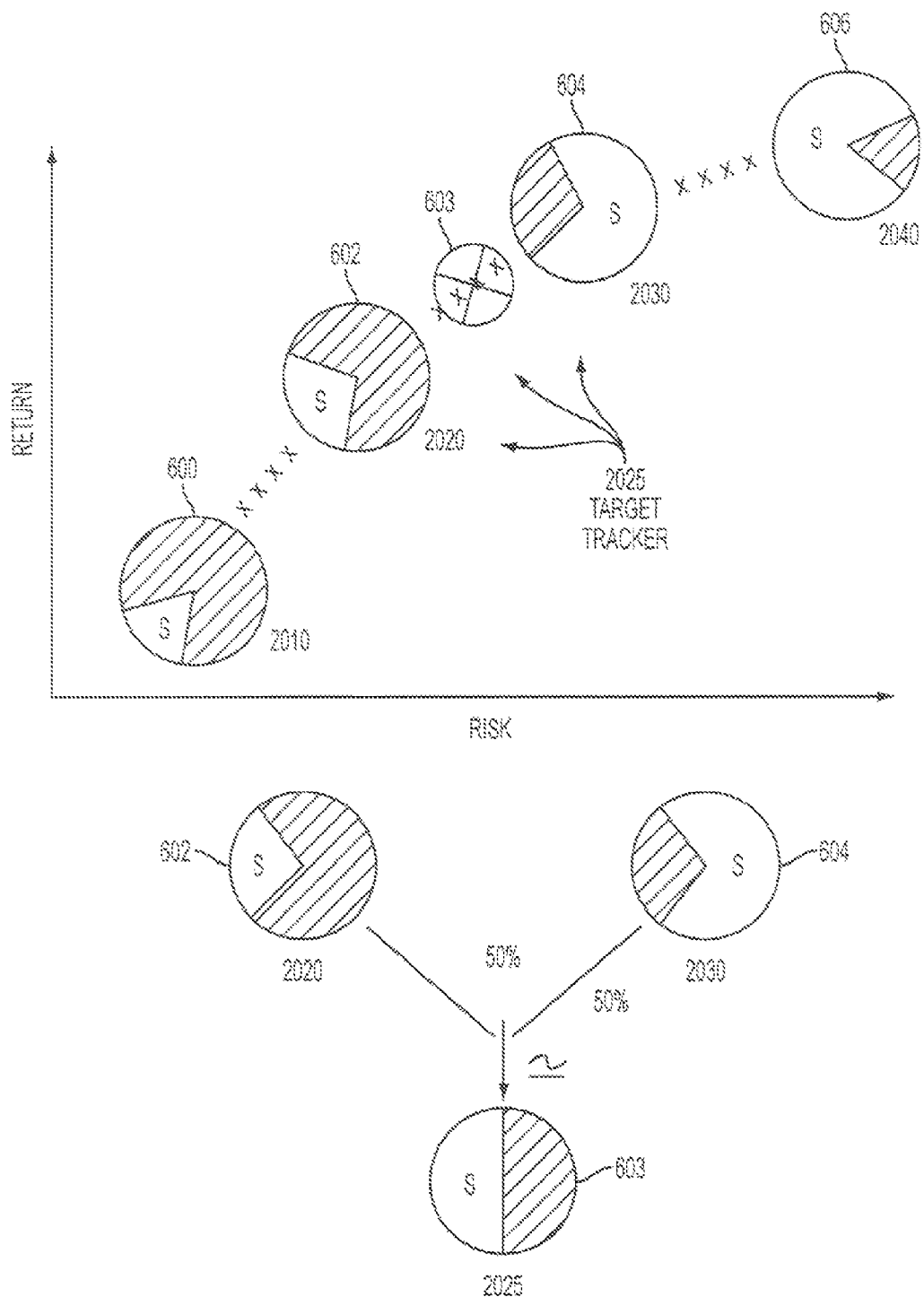
FIG. 6 is a diagram showing a target date portfolio set and development of a portfolio between dates of in the portfolio set according to an illustrative embodiment of the invention.

If this interpolating parameter is set to zero, the system only allows full allocation to one fund and only one target date fund, and the investable set consists of the just the TDF investments. For example, with reference to FIG. 6, the Target Date portfolio set includes four funds dated ten years apart: a 2010 fund 600, a 2020 fund 602, a 2030 fund 604, and a 2040 fund 606. The TDFs already present an optimal efficient mix from the perspective of the TMF investment manager, and thus represent points on the manager's efficient frontier. This investable set it handed to the portfolio completion algorithm.

In another embodiment, the interpolating parameter can be set to 1 or more. Since the TDFs represent already optimized efficient portfolios, the linear combination of the efficient portfolios can also be used to trace the missing efficient points. Thus, the efficient points between adjacent dated TDFs can be reached through their combination portfolio 603, to thereby span the entire frontier. For the TDFs set dated 2010, 2020, 2030, and 2040, the interpolating portfolios could have nine additional points, to provide portfolio mix for every year, and create an sequence of 31 points with monotonically increasing risk and return which becomes the investable TDF set handed to the portfolio completion algorithm.

A minimum distance algorithm, further described below with reference to FIG. 7, can find the specific TDF portfolio within an investable set that minimizes the distance to a personal target glide path portfolio of total wealth for that year. When there are no non-recommendable assets, the solution results in a pure target date based assignment. In the illustrative embodiment, the investor has a personalized glide path of the fund family such that the investor's goal date is the target date. So for an investor with a 2025 goal date 603, the linear combination of 2020 TDF 602 and 2030 TDF 604 can be found that minimizes the distance to the 2025 glide point on the glide path. If the investor's date aligns with a specific fund's target date exactly, she will be assigned that TDF. However, if the goal date is in between two target dates, then she is assigned the linear combination of the two nearest TDFs to create an effective personalized investment allocation.

Furthermore, if the investor has outside personal assets, then the algorithm automatically finds the effective portfolio that achieves a minimum distance to their target glide path now, and at each period in the simulation. As the algorithm steps forward one period in the simulation, all the TDFs move down the glide path one period, the interpolating portfolios calculated, and then completion algorithm is repeated to obtain the minimum distance TDF for that period in the simulation run.

Portfolio Completion Method and System

The second configuration of the Portfolio Recommendation algorithm specification in the illustrative embodiment of the invention is the choice of the distance measure to optimize. This distance measure could be the minimum variance of tracking error between total wealth portfolio and target portfolio, or some other measures like maximize correlation of total wealth portfolio to target portfolio, or even minimize difference in stock/bond ratio, for example. An illustrative embodiment of the completion portfolio process is minimizing the variance of the tracking error of returns of the total wealth invested in investor's overall wealth portfolio and the target glide path portfolio for each time period t. This minimum variance completion portfolio process is described in detail herein and is repeated in each period of the simulation to follow the Target Date glide path of asset allocation.

Figure 7:
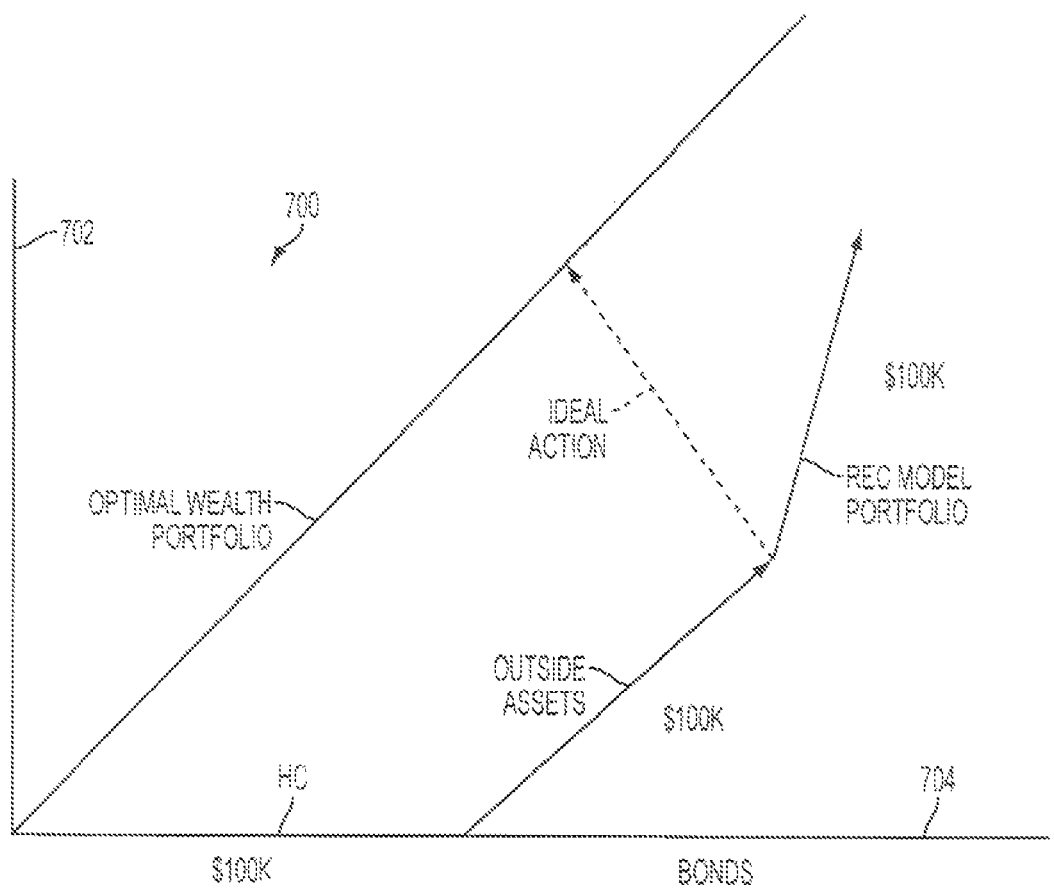
FIG. 7 is a vector diagram showing a minimum variance portfolio completion with two asset classes according to an illustrative embodiment of the invention.

Referring to FIG. 7, a vector diagram is an illustrative embodiment of a minimum variance portfolio completion with two asset classes. This example can be represented using a two dimensional diagram, however such diagrams typically include as many dimensions as asset classes or underlying factors. Here, equity is represented in the Y axis 702 and bonds are represented in the X axis 704. A most conservative recommendation is provided in this case in which NPV of future asset flows is $100 K, outside non-recommendable assets have $200 K with a 90% Equity/10% Bonds split and the achievable optimal wealth portfolio is created by in vesting the $80 K financial wealth in conservative model portfolio with 10/90 split.

Each portfolio is represented in Hilbert space, as an abstract vector with dimensions equal to the number of benchmarks, with a unit vector in each dimension representing the dollar value of investment. Hilbert space is a linear space with an inner product. This can be either positive representing an investment, or negative value representing a short position. The first input to the method is a total wealth 701, and an optimal portfolio allocation, which together create the optimal wealth vector with each vector-dimension representing a target wealth in each asset. The second input is the vector of combined non-recommendable 703 and/or non-tradable assets 705 at the same point in time as the optimal wealth vector. The third input, is the set of set of recommendable portfolios to choose from. The last input, is the covariance matrix of all the recommendable and non-recommendable assets involved. The recommendable completion portfolio vector 706 is chosen from the set of allowable recommendable portfolios from input three, such that the resulting difference portfolio vector 708 has minimum length, which equivalent to minimizing its variance.

The difference portfolio vector is the difference between total wealth portfolio vector and the optimal portfolio vector. The variance of the difference portfolio vector is calculated using portfolio weights and the covariance matrix of the classification benchmarks EQUATION 8 (See Appendix).

Personalizing TDF Guidance/Advice

Figure 8:
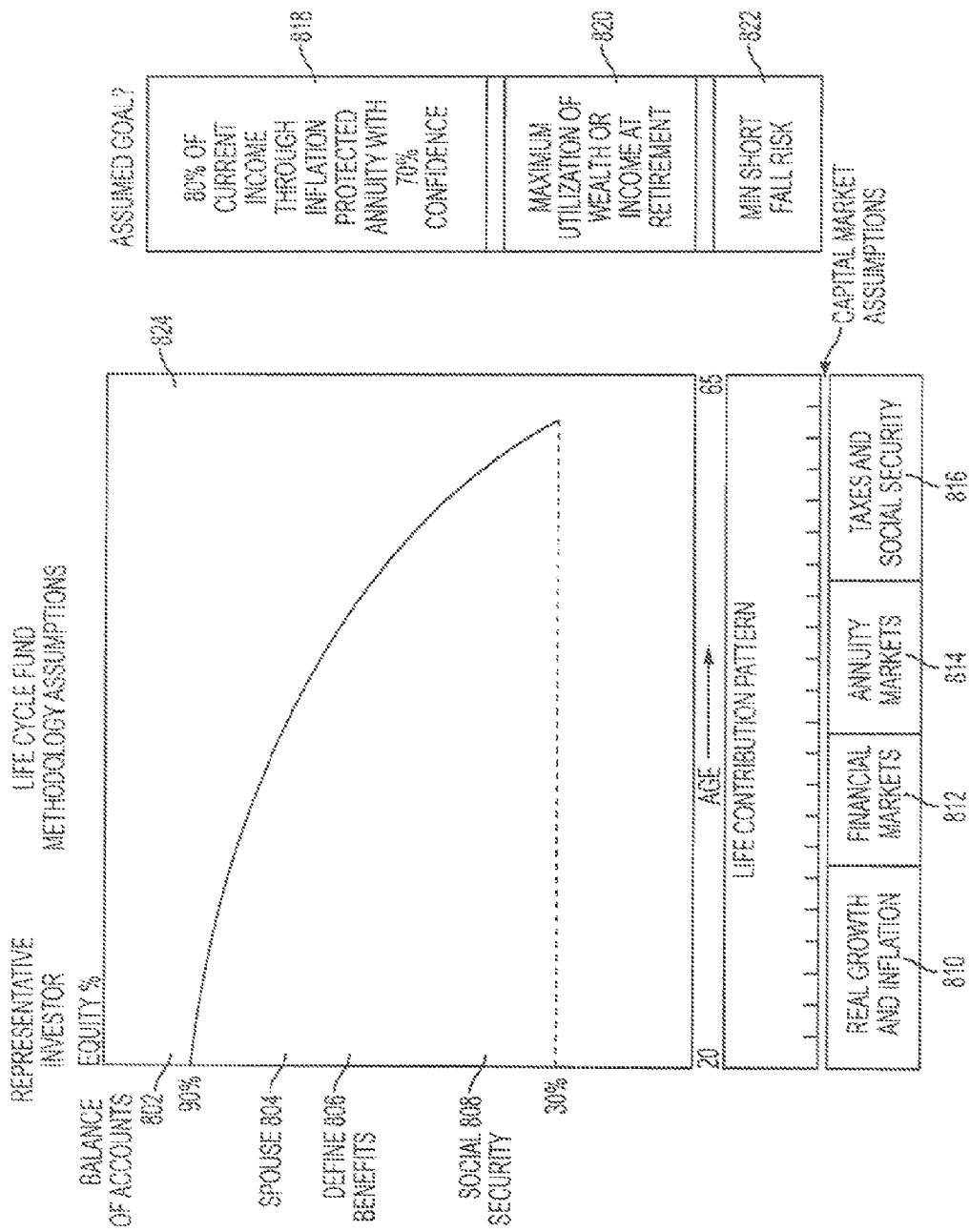
FIG. 8 is graphical overview of a TDF methodology configuration of a glide path, and the representative investor's profile for constructing a methodology.

FIG. 8, provides an overview of the TDF methodology configuration of the glide path, and the representative investor's profile that went into construction of the methodology according to an illustrative embodiment of the invention. The representative investor may have account balances 802, a spouse 804, defined benefits 806 and social security 808, for example. The illustrative methodology may also include certain capital market assumptions including real growth and inflation 810, financial markets 812, annuity markets 814 and taxes and social security 816. The representative investor will have certain assumed goals such as achieving 80% of current income through inflation protected annuities with 70% confidence 818, maximizing utilization of wealth or income at retirement 821 and minimizing short fall risk for constant income 822, for example. A resultant periodic asset allocation trajectory over time T is represented as allocation mix versus year to target date 824 is generally assumed.

Figure 9:
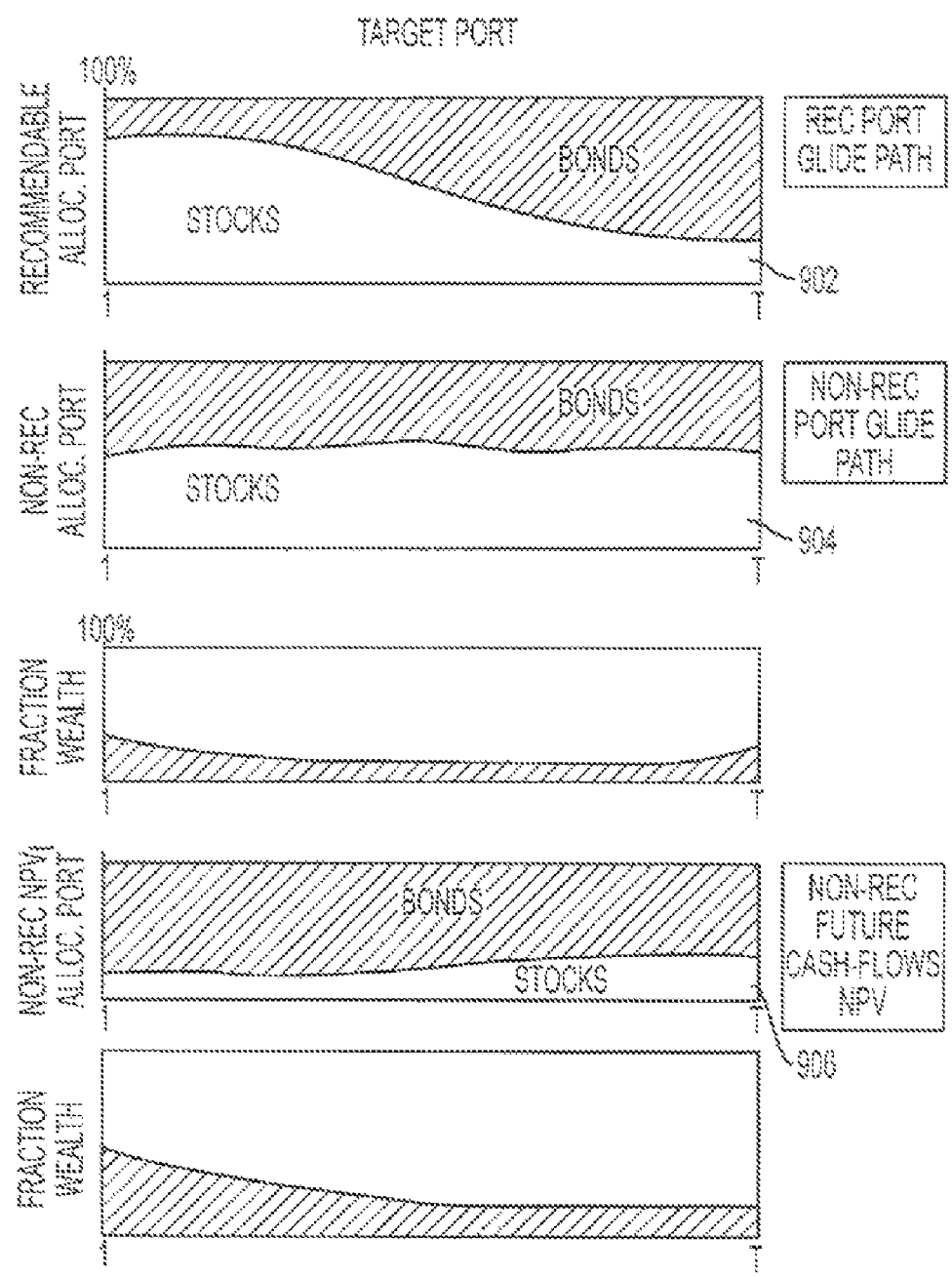
FIG. 9 is diagram showing configurations of target date methodologies in increasing levels of customized guidance/advice according to an illustrative embodiment of the invention.

The target date methodology can be configured with three layers of abstraction, for example, that can enable increasing levels of customization of the guidance/advice as shown with reference to FIG. 9. In a first layer of abstraction, 902, may provide a glide path from a recommendable allocation portfolio, for example. A second layer 904 of increasingly customized guidance/advice may provide a glide path from a non-recommendable portfolio as a fraction of wealth. A third layer of increasingly customized guidance/advice may provide a glide path 906 from a non-recommendable net present value of future asset flows.

In a particular methodology publisher configuration, where completion portfolio algorithm may not consider an investor's outside assets or future asset flows, and the only account to consider is the tax deferred account with portfolio choice of TDF family members. The only consideration is how the investor's goal date differs from that of representative investor of each of the individual TDF. As shown in FIG. 2, case 1 (200) for example, the choice is simply of a linear combination of TDFs such that the portfolio tracks to the optimal target mix for the period. If the goal date of the investor happens to line up with the an existing date, then the investor is allocated to single fund. However, if the goal date of the investor is in between that of two funds, then a linear combination of the two near dated funds is chosen. The exact portfolio weights of the TDF allocation depends on the configured tracking algorithm. Furthermore, if for some reason the goal date of the investor is pushed back a year, because he is under saved, then portfolio allocations between investable TDF would appropriately adjust slightly towards the later dated fund.

In another particular methodology publisher configuration, completion portfolio algorithm may consider also investor's goal date and outside non-recommendable assets in providing TDF guidance/advice. As shown in FIG. 2, case 2 (205) for example, the algorithm invests the recommendable wealth in the investable TDF portfolio such that over all investor wealth portfolio that combines recommendable and non-recommendable wealth, most closely tracks the entire wealth invested in the target portfolio for the date. The choice of the investable TDF portfolio as the recommendable allocation makes the overall wealth allocation most closely track to the entire wealth target portfolio. In addition, the configuration details about representative investor that was used to create the TDF provider's asset allocation glide path can also be provide. As shown in FIG. 2, case 4 (209), for example, the methodology provider has to configure the representative investor's outside wealth fraction and its corresponding non-recommendable portfolio allocation with respect to reference date that is baked into constructed glide path. In this case, if the investor's information is also available for non-recommendable assets, the target portfolio is modified to be the combination of recommendable wealth invested in asset allocation glide path and corresponding fraction of wealth in non-recommendable asset allocation glide path.

In another particular methodology publisher configuration, completion portfolio algorithm may consider also investor's recommendable assets, outside non-recommendable assets, as well as future asset flow in providing TDF guidance/advice, as shown in FIG. 2, case 3 (209), for example. To deal with the future asset flows, the algorithm first calculates the net present value at time t each of plurality asset class future flows. The configurations specifies the mortality probability weighting and types of cash-flows that can be considered, and the type of asset classes they are represented by in applying the appropriate discount factor, to calculate value backwards in time for consideration in portfolio completion at each time t. For example, the investor can provide information about expected defined benefits, annuities, 401(k) loans, and ad-hoc asset flows from inheritance. In addition, the configuration details about representative investor that was used to create the TDF provider's asset allocation glide path can also be provide by provider. For this to take place, the methodology provider has to represent the representative investor's outside future asset flows as it's corresponding non-recommendable portfolio allocation with respect to reference date and the corresponding fraction of wealth it represents, as shown in FIG. 2, case 5, for example. In this case, if the investor's information is also available for non-recommendable assets, the target portfolio is modified to be the combination of recommendable wealth invested in asset allocation glide path, the corresponding representative investor's fraction of wealth in non-recommendable tradable asset allocation glide path and another set of glide paths corresponding non-recommend future cash-flows faction of wealth and asset allocation over time. In this case, the tracking algorithm invests the recommendable wealth in the investable TDF portfolio such that over all investor wealth portfolio that combines recommendable, non-recommendable wealth and NPV of future asset flows at period t, most closely tracks the entire wealth invested in the target portfolio for the date.

If an investment manager's TDF glide path construction assumptions and representative investor data are provided to this system, the system can further personalize the investment strategy on factors other than investor's age. The factors can include, but are not limited to, investor's future asset flows, including saving contributions, multiplier of wealth to be accumulated by age for target investor, social security benefits, defined contribution benefits, outside 401K, spouse, and other expected ad-hoc inflow/outflow of capital, for example. A Methodology Publisher can specify the factors to consider in the personalization. The NPV of future asset flows based on the considered asset-flows of the representative investor is compared to that of the individual, and the difference applied to the portfolio completion process.

In illustrative embodiments of the invention, the system generates a set of asset portfolios and implements transactions, point in time, and or over rebalanced intervals. The transaction recommendation can be one or more investment vehicle that are internally tracking the glide path, or the system can generate portfolio recommendations to directly track the glide path, for example.

The portfolio completion, can be applied to just the first period, or at each period, for each of the simulation runs. The optimal choice could be performed using a number of algorithm, including quadratic programming solution of all the fund allocations for each period. In an illustrative embodiment, a simpler more direct approach such as a root finding algorithm may be used.

An individual's outside non-recommendable wealth could be drastically different than that of the representative investor. The future profile of an investor could also impact the Target Date guidance/advice by taking into account difference between the investor and representative investor. The fund manager can specify the relative proportion of wealth and portfolio allocation of non-recommendable assets for representative investors at each point in time and accordingly change the target portfolio for each period. The fund manager can also specify the types of assets that were considered in the non-recommendable wealth, including financial assets, discounted present value of future asset flows from defined benefits, annuities and other things like social security benefits. Accordingly, the same information is taken into account from the investor profile if available. If such information is not available then the methodology defaults assumptions are applied. Thus, portfolio guidance/advice can take into account specified characteristics where a particular investor is different from the representative investor.

Life-Time Wage Forecasting

A Methodology Publisher can specify the life-time salary and a corresponding savings contribution by age for the investor using a number of alternative methods. The Methodology Publisher may supplying the actual schedule of percentage step increase and decrease for the salary and contributions by age. Alternatively, the Methodology Publisher may enable future wages increase to keep pace with inflation, or increase/decrease in real terms with age. Alternatively, the publisher may enable AFA to use an investor wage-forecasting model. An illustrative embodiment of such a real wages forecasting model is a fitted a linear piece-wise function calibrated to national U.S. Census data, and industry salary data. The annual salary may be discounted for that period by a fraction of the national unemployment rate for each period to account for risk of the investor being unemployed. This probability of unemployment discount is set by a Methodology Publisher. This wage forecast can then be multiplied with the forecasted savings rate for each period to provide an estimate of the individual's savings contribution for each period.

This annual savings contribution can then be combined with employer matching rules and bonus rules, and applied to account type buckets including tax deferred pre-tax and post-tax, and taxable contributions, for example. The individual's data can be provided directly through the record keeper, or may be provided by the individual.

Converting Wealth Values to Income Values for Goal Evaluation

Depending on the embodiment, wealth is converted to goal income in different ways.

In simple accumulation mode, the illustrative embodiments of an AFA system use synthetic inflation protected annuitization to provide estimate of life-long income that maintains a standard of living. Accordingly, the synthetic annuitization model is flexible and supports a number of configurable parameters including support for immediate fixed versus inflation protected annuity modeling, term of annuity cash-flows, and joint-survivorship, for example.

In a transition investor or spend down mode, the illustrative AFA system forecasts the wealth using withdrawal strategy and spends down the assets, while rebalancing to the reference date investment until a specified late age. The system can also model systematic withdrawals with or without annuities on any underlying portfolio mix with standard clauses such as Guaranteed Minimum Withdrawal Benefits for Life (GM-WBL), for example.

In college savings mode, the system can convert the wealth into a Bond or CD ladder for a fixed term to cover the college expense and inflation between periods.

Simulation Steps

In the Simulation steps according to an illustrative embodiment of the invention, the investor's investments are classified into passive replicating benchmark portfolios and forecasted using a pre-generated or runtime generated Monte Carlo simulation dataset that reflects the Methodology configuration for AFA. For each simulation run, at the beginning of each simulation period any cash out flows are removed. Then each benchmark balance is adjusted based on its simulated performance for the simulation period. At the end of the period any savings are added, and the total wealth is rebalanced according to the configured rebalancing strategies for both recommendable and non-recommendable assets.

In accumulation mode, this continues until horizon age. At horizon age, the ending wealth is used to purchase a synthetic inflation protected fixed annuity. This synthetic annuity provides a conservative estimate of the achievable horizon income produced along each simulation run. For married investors, it considers a joint-survivor life-time inflation protected annuity, with survivor benefit percentage as a parameter. The annuitization model parameters are configurable in IMA.

Optimization

In an accumulation mode of the illustrative embodiment, AFA recommends future savings rates, an initial asset allocation portfolio, and if necessary a horizon age to achieve a specified horizon income at a specific goal probability. The default horizon income target is specified as a percentage of post-tax income but is configurable.

The default goal target success probability of 70%, for example, is configurable by the Methodology Provider as well as by the investor. A constraint prevents AFA from changing a recommendable variable such a saving rate in-plan, savings rate out-of-plan and age of retirement. The constrained optimization can be used if a investor want freeze one or more of the variables to specified limits and optimize the rest.

Synthetic Annuitization

According to the illustrative embodiment of the invention, the AFA uses synthetic annuitization for multiple purposes. The system can also model variable annuities on an underlying portfolio mix, including a variable annuity over TDF with standard clauses such as Guaranteed Minimum Withdrawal Benefits for Life (GMWBL), for example.

Embodiments of System

In a basic wealth accumulation embodiment, an employee uses the system to receive a simulation forecast distribution of retirement year wealth and income based on current employee salary and savings rates assumption and allocation to presumed or specified retirement age based assignment of Target Date investment fund. In this embodiment, the Methodology Publisher turns off the portfolio completion process and each account bucket is forecasted independently based on its balances, asset allocation, cash-flows and rebalancing strategy. The retirement income estimate is based on presumed pre-tax purchase of an inflation protected life-time annuity at retirement combined with estimated or specified social security benefits. Alternative forecasts can be made with other savings constant rates, or with a specified savings schedule that step-up rates over time until it reaches a maximum. This basic Target Date investment forecast provides a significant advance from current retirement wealth/income calculators prevalent in the industry because they do not provide accurate simulation forecasts based on an asset allocation glide path of the Target Date investments.

In first innovative advancement to the basic embodiment, for selected TDF(s) the AFA recommends the required personalized savings rate needed to achieve retirement income goals with given confidence. Based on the Methodology Publisher configuration, an optimal savings rate could be based on one-time large increase in savings rate, or a gradual step up increase to a terminal savings rate. For selected TDF(s), the system increments optimizes saving rate in priority order the tax deferred pre-tax contributions, the tax deferred post-tax contributions, as well as the taxable post-tax contributions, to achieve the desired retirement income goal at the specified confidence. Based on a Methodology Publisher configuration, the optimal savings rate recommendation could be based on a one-time increase in savings rate, or a gradual increase that annually steps up savings to a terminal savings rate that is solved. The system thus delivers an estimation of required savings to retirement goals with the Target Date investment vehicle.

In another advancement to the basic embodiment, for selected TDF(s), the AFA recommends the lowest retirement age and required savings rate needed to achieve retirement income goals at the specified confidence. This solution becomes important near retirement for workers who are under saved and unprepared for retirement. This would happen if the retirement goal is not achievable with maximum savings contribution rate, and thus the investor might have to continue working past the preferred retirement in order to maintain a desired life style. For selected TDF(s), the system increments the retirement year, one year at a time to the maximum retirement age, and checks to see if specified savings rates can achieve the desired retirement income goal at the specified confidence.

Another embodiment the system can also provide recommended combinations of TDFs of the family to exactly target a retirement year. For example, if an investor's TDFs only offer choices in decade increments, and her target retirement age is 67 in year 2014. The system would allocate her to nearest retirement age based TDF. However, if the Methodology Provider has configured appropriate interpolated portfolios between the target dates, then assignment can create an effective personalized 2014 blend portfolio by recommending investment of 60% in 2010 fund and 40% in 2020 fund. If the investor is under saved significantly, AFA could recommend pushing the retirement age by 2 years, to age 69 at year 2016 and the investor accepts this recommendation, then the proposed TDF blend would be 40% in 2010 fund and 60% in 2020 fund, resulting in a personalized 2016 blend portfolio.

Additional embodiments allow AFA to take into account outside factors during a simulation. In the simplest such accumulation embodiment, the forecasting and savings recommendation can take into account spouse income, retirement needs and social security, for example.

In another accumulation embodiment, the Methodology Publisher can configure the system to provide a one-time only assignment of TDF(s) with or without savings rate recommendation and then simulate forward by dynamically rebalancing to the investment's underlying asset allocation to an appropriate glide path to retirement date. The Methodology Publisher can configure the non-recommendable financial assets to be simulated in independent buckets but to not impact the portfolio recommendations in each period. The one-time TDF assignment mechanisms include but are not limited to following strategies. First, a one-shot recommendation could be based on one-time use of the portfolio completion algorithm at current period based on allowed outside non-recommendable financial and non-financial assets that are configured by Methodology Publisher. Second, a one-shot recommendation could also be based on up-front assignment of TDF(s) that maximizes the confidence of achieving a retirement goal for a current or step-up schedule constrained savings rate. Third, a one shot-recommendation could assign the TDF(s) that minimizes a required optimized savings rates to achieve a desired retirement income goal with given confidence.

In an illustrative accumulation embodiment, the Methodology Publisher sets an objective that the total financial wealth of the investor and spouse should track the glide path asset allocation. Thus, the combination of existing non-recommendable financial assets and the recommendable 401K assets would most closely reflect the age based glide path in the current period and each period of simulation. The non-recommendable financial assets can be configured to grow such as buy-hold, or fixed-mix rebalanced to their current asset allocation in the simulation. In each period of the simulation, the portfolio completion process takes place to track the target allocation. The system could recommend a current allocation that is different than the pure age based allocation, by using fund(s) from the chosen TDF family. Furthermore, this system takes into account spouse financial assets, to ensure that family net assets follow the TDF glide path.

In an advanced accumulation embodiment, a Methodology Publisher can set a completion portfolio objective that further takes into account other differences regarding how financial non-tradable future asset-flows of investors differ from those of an assumed representative investor used to create the Target Date glide path. For example, the investor that may have a pension defined benefit income that materially affects the retirement needs. This future benefit income is reflected in current period as a shadow NPV bond position, and thus allows investor to take a more aggressive equity allocation while maintaining a target asset allocation. Other future cash-flows include self or spouse annuities, differences in social security benefits estimates, 401k student loans, inheritance and other ad-hoc asset flows. The system thus allows flexibility of individually tailored guidance/advice that would be expected from an investment advisor.

In accumulation embodiments, AFA outputs the recommendation of the guidance/advice on TDF portfolio, savings rate recommendations and age. In an illustrative another embodiment, the AFA output could be used by Director to send trade orders for purchase and rebalance of the actual TDF(s) investments and instructions for record keeping systems to change employee savings contribution rates. In one embodiment, the AFA results provide illustrative guidance on TDF asset class mix and savings rate but not offer transaction recommendations on specific TDF investments. In another embodiment, the AFA is invoked by an external system that consumes the resulting guidance on TDF asset class mix, and further processes the recommended asset class portfolio as the benchmark to build tracking investment portfolio of available discretionary investment managers available inside a defined contribution plan or in a brokerage account.

In a retirement income embodiment, the Methodology Publisher can configure the AFA to provide an illustration or recommendation for sustainable retirement income withdrawal for retirement income TDFs, and assignment in appropriate reference date funds. The substantive difference from accumulation mode is that retiree input is critical to providing an accurate forecast of retirement income because individual circumstances vary significantly between people. Thus, a user interface allows a retiree to provide details about their projected basic and desired income at various level of granularity to build up a spending budget by phase of retirement. The retiree may have staggering sources of income coming from social security, defined benefits, inheritance and other part-time work, for example. These sources of income, expense and minimum distribution requirements are taken into account to forecast simulated retiree life until a very late age. This simulation allows the investor to calculate the age at which the retiree would run out of money with specified confidence. The embodiment may also simultaneously show probability of survival to that age, for example.

In a more advanced retirement embodiment, the system can directly optimize the spending rate or real dollar budget that would allow the investor to survive until specified age with a given level of confidence given all the investor inputs, for a given reference date investment. A further advanced retiree embodiment of the system can provide a one-time or dynamic completion portfolio for the retiree by considering outside financial assets and a surviving spouse that may also provide retirement income recommendation.

In an education savings embodiment, such as that for 529 plans, the Methodology Publisher can configure the system to provide illustration and recommendation for a savings rate and/or appropriate TDF. The education TDF needs to be evaluated within a context that requires funding short-period college expenses with projected cost inflation of expenses relevant to education. This excludes considerations like social security and defined benefit plans to provide the basic forecast of goal achievability. However, the system can include a number of the advanced embodiments from retirement including savings plan optimization and recommendation of TDFs with consideration of outside non-recommendable assets that are marked for college savings.

In another embodiment the system provides illustration, guidance and advice on annuity and insurance products that build on the Target Date framework. These include variable annuities and guarantee riders including income or principal protection, for example.

Due to large variations in lifestyle choices after retirement, a "one size fits all" approach is even more inappropriate for investors than simple Target Date age base funds. Trying to add a universal income guaranty feature without individual forecasting and analysis can results in significant issues for retiring investors that may face liquidity squeezes relative to their mortality needs. A framework for investors to pick a Target Date product, with appropriate level of income or principal protection guarantee and pooling mortality risk is provide by embodiments of the present invention.

Typical retirement income guaranty programs carry a significant and hidden cost. Heretofore, investors in such programs could evaluate the trade-off they are making between guaranty and income upside potential. Locking in guaranteed income amounts in retirement is a complex decision, and retiree situation and preferences diverge significantly. The investor has to explore their preferences, and make an informed decision after accepting from a series of alternative choices, to narrow down to a dominant custom tailored solution. A first step to the solution is to help investors understand retirement income distribution outcomes without guarantee using forecasting and optimal savings guidance/advice according to illustrative embodiments of the present invention. The systematic withdrawal retirement income is simulated with appropriate IRS required minimum distribution requirements at retirement, that come into force at age 70½.

According to an embodiment of the present invention, a investor can compare a base forecast with addition of available guarantee riders, the specific cost of a feature and its downside protection trade-offs. The investor can also compare the base forecast with an addition of variable annuity feature for various choices of Assumed Interest Rate (AIR). The investor can also trade-off higher initial payment and retirement income in markets that underperform, for example. These additional annuity and guarantee features can either be shown as a piece-meal menu, or bundled together as single option choices of levels of protection, or term guarantees. Investment of pre-tax qualified 401(k) wealth into annuities side steps current IRS required minimum distribution requirements. This impact is an important considerations for investors to understand in comparing retirement outcome from the choice of product.

Investors have different preferences for different types of contracts that offer minimum wealth benefits, minimum fixed income benefits and minimum inflation adjusted benefits. Through this interactive process, each investor can gain insight into the value of a particular guaranty benefit. Investors using embodiments of the present invention can understand retirement outcomes on various levels of such guarantee amounts depending on scenario analysis and trade off with upside potential. Embodiments of the invention provide need transparency different guarantees. Competitive costs can be properly taken into account in the simulation to reveal drag of such costs on sustainable retirement income. For example, an important factor to understand is insurance firm's credit risk, in thus, this embodiment takes into account insurance firm default risk on the actual guarantee protection when financial markets themselves systematically collapse.

In addition to interactive modes provided by various illustrative embodiments of the invention, advanced embodiments include optimizations which provide personalized recommendations for savings and retirement income decumulation. Because a variable annuity/guarantee rider bundle has to be associated with known portfolio characteristics, the completion portfolio algorithm is not applicable in this embodiment. Because a choice of an annuity/insurance bundle is an irrevocable contract, the joint guidance/advice for bundle and TDF must be one-time guidance/advice that is then simulated forward.

An accumulation mode can be used to co-optimize product bundle choices with savings. The choices can be co-optimized with appropriate AIR that impacts retirement income in spend down mode of the invention.

The Methodology Publisher can turn off the completion portfolio feature, and can specify an optimizer to solve for a choice of combination of a single date fund and the deferred variable annuity/guarantee rider bundle that minimizes the savings rate to achieve goal target in accumulation. In decumulation mode, the bundle can be an immediate variable annuity/guarantee ride. The optimizer solves for an AIR that maximizes sustainable retirement income spend-down that meets threshold goals such as certain confidence to an advanced age, for example.

In a further advanced embodiment, the variable annuity choice is irrevocable and the investment choice underneath the vehicle is not irrevocable. The owner can have the right to maintain of investment choice. This embodiment does not have a guarantee choice, but it opens up a possibility to offer further financial services of portfolio management. A personalized blend's target date can be further based on an insurance company's more sophisticated estimate of the individual's mortality expectations according to on the individual's ongoing health, lifestyle, gender, and other factors that impact mortality. The target date can be updated periodically as these factors change. This personalized glide path is then tracked using a completion portfolio that takes into account specific outside factors depending on level of financial service offered by the Methodology Publisher. At a simple level, no outside financial situation is taken into account. At this level, a combination of reference date investments are chosen to track the individual's updated mortality reference date. In this embodiment the optimization algorithm picks the AIR that solves for a retirement income that can reach a late age with specified confidence. The advanced age may be defaulted by the Methodology Provider to a configured value, or it may be calculated dynamically from the individual's updated personal mortality table such that her conditional probably of being alive decreases to a present low value (like 10%) set by the Methodology Provider.

For more advanced financial services, the completion portfolio can also take into account non-recommendable outside accounts with future expected cash-flows that provide personalized portfolio guidance/advice that is simulated forward. In this case, the variable annuity bundle may have sub-accounts of one or more reference date vehicles A personalized reference date blend investment can be optimally chosen as an guidance/advice option. For a joint survivor and other payout options, a weighted average of reference dates for a personalized glide path can be calculated based on joint mortality.

The terms Life Cycle fund, target mutual fund and TDF may be used herein with the same meaning as the term Target Date Fund and TDF.

While the present invention is described generally herein in terms of an ASA system which may include certain algorithms and software processes it should be understood that illustrative embodiments of the invention include computer system components such as processors, memory and communication devices that are particularly configured and or programmed to perform the various processes and implement the various systems and data transformations described herein.

While the invention has been described with reference to illustrative embodiments, it should be understood by those skilled in the art that various other changes, omissions, and/or additions may be made and substantial equivalents may be substituted for elements thereof without departing from the spirit and scope of the invention. In addition, many modifications may be made to adapt a particular situation or material to the teaching of the invention without departing from the scope thereof. Therefore, it is intended that the invention not be limited to the particular embodiment disclosed for carrying out this invention, but that the invention will include all embodiments, falling within the scope of the appended claims. Moreover, unless specifically stated any use of the terms first, second, etc., do not denote any order of importance, but rather the terms first, second, etc. are used to distinguish one element from another. Equations referenced herein are presented in the Appendix attached hereto which incorporated in the present specification by reference.

APPENDIX

Returns Based Style Analysis $$\tilde{R}_i = [b_{i1}\tilde{F}_1 + b_{i2}\tilde{F}_2 + \ldots + b_{in}\tilde{F}_n] + \tilde{e}_i \quad \text{EQUATION 1}$$

$$\text{such that } \sum_{f=1}^{n} b_f = 1 \text{ and } b_f \geq 0$$

http://www.stanford.edu/~wfsharpe/art/sa/sa.htm

Simulation $$\tilde{W}_{Tk} = \sum_{t=0}^{T-1} X_{1t} C_t \prod_{j=t+1}^{T} (1 + \tilde{R}_{j1\ k}) + \quad \text{EQUATION 2}$$

$$\ldots + \sum_{t=0}^{T-1} X_{nt} C_t \prod_{j=t+1}^{T} \left(1 + \tilde{R}_{jnk}\right)$$

is the final wealth outcome at time T for simulation run k.

$X_{it}$ is the date t dependent allocation for asset i, and scales the contribution for that period accordingly.

$C_t$ is the net contribution for time t, with initial wealth as t=0, can be based on investor supplied value, optimized value provided by the system, or step-up savings schedule of the plan sponsor.

$\tilde{R}_{jik}$ is the random return for period j, asset class i for the simulation run k For tax deferred post tax contribution, the wealth the simulation also takes into account income taxes.

$$\tilde{W}post_{Tk} = \qquad \text{EQUATION 3}$$

$$\sum_{t=0}^{T-1} X_{1t} Cpost_t (1 - tax_{income}(Cpost_t)) \prod_{j=t+1}^{T} \left(1 + \tilde{R}_{j1\ k}\right) +$$

$$\ldots +$$

$$\sum_{t=0}^{T-1} X_{nt} Cpost_t (1 - tax_{income}(Cpost_t)) \prod_{j=t+1}^{T} \left(1 + \tilde{R}_{jnk}\right)$$

At retirement wealth the pre-tax and post-tax accumulated wealth is used to purchase an inflation protected immediate annuities in separate buckets for each account. The post-tax annuity also needs to keep track of cost basis for taxing of annuity income.

$$Wpre_{T|p=70\%} = P\{\tilde{W}_T, p=70\%\} \qquad \text{EQUATION 4}$$

The pre-tax income from annuity purchased with wealth in account q.

$$\tilde{I}^+_{Home|p=70\%\ k} = \begin{bmatrix} \sum_{q=1}^{n} Ipre^+_{qT|p=70\%\ k} - \\ tax_{income}\left(\sum_{q=1}^{n} Ipre^+_{qT|p=70\%\ k}\right) \end{bmatrix} + \qquad \text{EQUATION 5}$$

$$\begin{bmatrix} \sum_{i=1}^{n} Ipost^+_{iT|p=70\%\ k} - \\ \sum_{i=1}^{n} tax_{gains}(Ipost^+_{iT|p=70\%\ k}, B_i) \end{bmatrix}$$

$I_{Home,k}^+$ is the distribution of take home income that is sum of the pretax and most tax annuitized income taxed at the appropriate rates. Pre-tax annuity income are summed and taxed according to income tax schedule, while the post tax annuities income are taxed based on their respective cost basis $B_i$.

$Ip\tilde{r}e_{qTk}^+$ is the distribution of pre-tax inflation protected annuity income.

$Ip\hat{o}st_{qTK}^+$ is the distribution of post-tax inflation protected annuity income.

$$I_{Home|p=70\%\ k}^+ = P\{\tilde{I}_{T,k}^+, p=70\%\} \qquad \text{EQUATION 6}$$

NPV—Future Asset Flows $\Delta NPV_{it}$ is the net present value of investor's mortality weighted discounted value at time t of future flows of asset class i, where the discount factor is of specific asset class.

$$\Delta NPV_{it} = \sum_{j=t}^{T} \frac{\sum (CF_{it} - E[CF_{it}]) \cdot \prod_{m=t}^{j}(1 - p_m)}{(1 + r_i)^{(j-t)}} \qquad \text{EQUATION 7}$$

$E[CF_{it}]$ is the expectation flow of asset class i at time t.
$p_m$ is the probably of death at year m
$r_i$ is the discount rate for asset class i
Portfolio Completion $$var_{tracking} = (P_{target} - P_{wealth})'C(P_{target} - P_{wealth}) \qquad \text{EQUATION 8}$$

$var_{tracking}$ is the variance of the tracking portfolio.
$P_{target}$ is the target portfolio.
$P_{achievable}$ is the wealth portfolio of the investor.
C is the covariance matrix of the asset classes.

What is claimed is:

1. A method for investor guidance of asset allocation and product specific advice for reference date dependent investments, comprising:
   maintaining a database including data of a set of current asset allocations for reference date dependent investment vehicles in consideration for an investor;
   receiving, by a computer, a representative investor profile for each of said reference date dependent investment vehicles;
   receiving, by said computer, parameters to match said investor to an appropriate asset allocation for at least one of said reference date dependent investment vehicles;
   receiving, by said computer, a profile of said investor; and
   comparing, by said computer, said profile of said investor with said representative investor profile for each of said reference date dependent investment vehicles;
   calculating, by said computer, a deviation metric of said investor from said representative investor, said deviation metric being a difference between said profile of said investor and said representative investor profile; and
   selecting, by said computer, an asset allocation appropriate for said investor based on said deviation metric.

2. The method of claim 1, wherein said profile of said investor includes data selected from the group consisting of investor age, wages, current account balances and holdings of a multitude of accounts, future expected account cash in-flows and out-flows of said of multitude of accounts, target goal date, target income, risk tolerance, and other expected sources of income.

3. The method of claim 2, wherein said deviation metric is a difference between said investor age and an age of said representative investor.

4. The method of claim 3, wherein said deviation metric further considers aspects of said profile of said investor deviation from said representative investor profile based upon a weighted function of difference provided by a methodology provider, said weighted function comprising age cohort, current income bracket, existing assets, risk tolerance and alternative sources of income.

5. The method of claim 2, wherein said multitude of accounts contain at least one account from a group of pre-tax and post-tax accounts for specified financial goals under consideration.

6. The method of claim 2, wherein said profile of said investor includes spouse or domestic partner profile information.

7. The method of claim 1, wherein said asset allocation of said representative investor with a smallest deviation metric is assigned to said investor.

8. The method of claim 7, further comprising choosing said asset allocation based upon a single representative investor that minimizes said deviation metric to said investor.

9. The method of claim 1, wherein said data includes at least one asset allocation glide path with respect to a reference date for at least one of said reference date dependent investment vehicles.

10. The method of claim 9, wherein said asset allocation glide path includes a methodology configuration including information in the group consisting of portfolio asset allocation over a period of time taking into consideration at least one of said reference date, said representative investor profile, assumed future asset flows and financial goals.

11. The method of claim 9, wherein said asset allocation glide path is pre-qualified based on a match between said profile of said investor and said representative investor profile.

12. The method of claim 9, wherein said asset allocation glide path is a target over all wealth portfolio for aggregate wealth including recommendable and non-recommendable accounts.

13. The method of claim 12, wherein said asset allocation glide path is calculated to minimize a distance metric between a target wealth portfolio and an aggregate wealth allocation, said aggregate wealth allocation including recommendable wealth invested in said recommendable account and non-recommendable wealth invested in said non-recommendable account.

14. The method of claim 13, wherein said distance metric is comprised of minimizing a tracking error variance between a target portfolio and a recommendable wealth portfolio.

15. The method of claim 1, further comprising:
invoking a director via a user interface;
retrieving, by said director, said profile of said investor and a methodology configuration, said methodology configuration including descriptions of at least one reference date dependent investment vehicle;
communicating a request from said director to an automated financial advisor, said request including said profile of said investor and said methodology configuration; and
recommending a reallocated portfolio by said automated financial advisor to said director.

16. The method of claim 15, further comprising communicating an implementation transaction from said director to an investment account record keeping system.

17. The method of claim 1, wherein a combination of available reference date dependent investment vehicles substantially matches said asset allocation appropriate for said investor.

18. The method of claim 1, wherein a combination of non-time dependent investment vehicles is optimized to substantially track said allocation appropriate for said investor.

* * * * *